US012041570B2

(12) United States Patent
Edge

(10) Patent No.: US 12,041,570 B2
(45) Date of Patent: Jul. 16, 2024

(54) SYSTEMS AND METHODS TO IMPROVE REGISTRATION OF A USER EQUIPMENT WITH SATELLITE WIRELESS ACCESS

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

(*) Notice: Subject to any disclaimer, the term of this patent is extended or adjusted under 35 U.S.C. 154(b) by 333 days.

(21) Appl. No.: 17/707,434

(22) Filed: Mar. 29, 2022

(65) Prior Publication Data

US 2022/0322268 A1 Oct. 6, 2022

Related U.S. Application Data

(60) Provisional application No. 63/169,202, filed on Mar. 31, 2021.

(51) Int. Cl.

| | |
|---|---|
| ***H04W 60/00*** | (2009.01) |
| ***H04B 7/185*** | (2006.01) |
| ***H04W 48/04*** | (2009.01) |
| ***H04W 84/04*** | (2009.01) |

(52) U.S. Cl.

CPC ........ *H04W 60/00* (2013.01); *H04B 7/18513* (2013.01); *H04W 48/04* (2013.01); *H04W 84/042* (2013.01)

(58) Field of Classification Search

CPC ... H04W 60/00; H04W 48/04; H04W 84/042; H04W 76/18; H04W 60/04; H04W 84/06; H04W 8/02; H04B 7/18513; H04B 7/18563; H04B 7/18565; H04J 11/0069

See application file for complete search history.

(56) References Cited

U.S. PATENT DOCUMENTS

| | | | | |
|---|---|---|---|---|
| 2020/0329422 | A1* | 10/2020 | Sirotkin | H04W 48/18 |
| 2021/0037496 | A1* | 2/2021 | Ryu | H04B 7/18545 |
| 2022/0264505 | A1* | 8/2022 | Ianev | H04W 60/00 |

OTHER PUBLICATIONS

Taleb, Tarik, and Andreas Kunz. "Machine type communications in 3GPP networks: potential, challenges, and solutions." IEEE Communications Magazine 50.3 (2012): 178-184. (Year: 2012).*

(Continued)

*Primary Examiner* — Sharad Rampuria

(74) *Attorney, Agent, or Firm* — Weaver Austin Villeneuve & Sampson LLP/QUALCOMM

(57) ABSTRACT

With satellite wireless access, a network node (e.g. AMF) may receive a NAS request from a UE, forwarded by a RAN node (e.g. gNB), where the NAS request includes a tracking area (TA) identity (TAI) indicating a TA in which the UE is located. The network node may then determine that the TAI is not part of a registration area for the UE, although the NAS request is not a NAS Registration. The network node may then instigate an immediate Registration of the UE, e.g., by rejecting the NAS request and sending an indication to the UE to Register, or a deferred Registration, e.g., by performing a NAS procedure for the NAS request and sending an indication to the UE to Register. The AMF may alternatively perform an implicit Registration of the UE, where the AMF performs Registration without receiving a Registration Request from the UE.

30 Claims, 14 Drawing Sheets

SPS SVs 190

100

102-1 102-2 102-3 SVs 112

NTN Gateways (Earth Stations)

104-1 106-1 gNB

124 LMF 125 LRF 128 NEF 140 External Client

122 AMF 126 GMLC

SMF 134 130 UPF SLP 132 5GCN 1

104-2 106-2 gNB 105 105 105

104-3 106-3 gNB 5GCN 2 110-1 110-2

NG-RAN

(56) References Cited

OTHER PUBLICATIONS

3GPP TS 38.321: "3rd Generation Partnership Project; Technical Specification Group Radio Access Network; NR; Medium Access Control (MAC) Protocol Specification (Release 16)", 3GPP TS 38.321, V16.0.0 (Mar. 2020), 3rd Generation Partnership Project (3GPP), Mobile Competence Centre, 650, Route Des Lucioles, F-06921 Sophia-Antipolis Cedex, France, vol. RAN WG2, No. V16.0.0, Apr. 9, 2020, pp. 1-140, XP051893926, Retrieved from the Internet: URL: ftp://ftp.3gpp.org/Specs/archive/38_series/38.321/38321-g00.zip. 38321-g00.docx [Retrieved on Apr. 9, 2020] paragraph [5.18.10].

International Search Report and Written Opinion PCT/US2022/022519—ISA/EPO—Jul. 11, 2022.

Nokia, et al., "Network Selection for NR Satellite Access", 3GPP Draft, 3GPP TSG-SA WG2 Meeting #143E, SP-210065, 3rd Generation Partnership Project (3GPP), Mobile Competence Centre, 650, Route Des Lucioles, F-06921 Sophia-Antipolis Cedex, France, vol. SA WG2, No. Elbonia, Feb. 24, 2021-Mar. 9, 2021, Mar. 12, 2021 (Mar. 12, 2021), XP051987846, 32 Pages, Retrieved from the Internet: URL: https://ftp.3gpp.org/tsg_sa/TSG_SA/TSGs_91E Electronic/Docs/SP-210065.zip 23502_CR2482rl_(Rel-17)_5GSAT_ARCH_S2-2101667 (23.502 NTN Network Selection)_V2r03.docx [Retrieved on Mar. 12, 2021] The Whole Document.

Qualcomm Incorporated: "TAC Update Procedure", 3GPP Draft, 3GPP TSG-RAN WG2 Meeting #113e, R2-2100742, 3rd Generation Partnership Project (3GPP), Mobile Competence Centre, 650, Route Des Lucioles, F-06921 Sophia-Antipolis Cedex, France, vol. RAN WG2, No. E-Meeting, Jan. 25, 2021-Feb. 5, 2021, Jan. 15, 2021 (Jan. 15, 2021), XP051973850, 5 Pages, Retrieved from the Internet: URL: https://ftp.3gpp.org/tsg_ran/WG2_RL2/TSGR2_113-e/Docs/R2-2100742.zip R2-2100742.doc [Retrieved on Jan. 15, 2021] The Whole Document.

* cited by examiner

SYSTEMS AND METHODS TO IMPROVE REGISTRATION OF A USER EQUIPMENT WITH SATELLITE WIRELESS ACCESS

CROSS-REFERENCE TO RELATED APPLICATIONS

This application claims the benefit of U.S. Provisional Application No. 63/169,202, entitled "SYSTEMS AND METHODS TO IMPROVE REGISTRATION OF A UE WITH SATELLITE ACCESS" filed Mar. 31, 2021, which is assigned to the assignee hereof and which is expressly incorporated herein by reference in its entirety.

BACKGROUND

Field of the Disclosure

Various aspects described herein generally relate to wireless communication systems, and more particularly, to accessing a wireless network using communication satellites.

Description of Related Technology

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Standardization is ongoing to combine satellite-based communication systems with terrestrial wireless communications systems, such as 5G New Radio (NR) networks. In such a system, a user equipment (UE) would access a satellite, also referred to as a space vehicle (SV), instead of a base station, which would connect to an earth station, also referred to as a ground station or non-terrestrial (NTN) gateway, which in turn would connect to a 5G network (e.g., directly or via a base station). A 5G network could treat the satellite system as another type of Radio Access Technology (RAT) distinct from, but also similar to, terrestrial 5G NR.

Since satellites typically differ from terrestrial base stations in terms of the size of their coverage areas, movement of coverage areas, longer propagation delays and different carrier frequencies, a satellite RAT may need different implementation than a terrestrial RAT for supporting common services to end users. One example of a different implementation could be support of registration of a UE with a serving network. It may then be preferable to both optimize, and to minimize the impact for, such a different implementation.

SUMMARY

With satellite wireless access, a network node (e.g. AMF) may receive a NAS request from a UE, forwarded by a RAN node (e.g. gNB), where the NAS request includes a tracking area (TA) identity (TAI) indicating a TA in which the UE is located. The network node may then determine that the TAI is not part of a registration area for the UE, although the NAS request is not a NAS Registration. The network node may then instigate an immediate Registration of the UE, e.g., by rejecting the NAS request and sending an indication to the UE to Register, or a deferred Registration, e.g., by performing a NAS procedure for the NAS request and sending an indication to the UE to Register. The AMF may alternatively perform an implicit Registration of the UE, where the AMF performs Registration without receiving a Registration Request from the UE.

In one implementation, a method performed by a network node in a 5G core network for supporting satellite wireless access by a user equipment (UE) to a serving public land mobile network (PLMN), the method includes receiving a non-access stratum (NAS) request message from the UE transported by a Radio Access Network (RAN) node in a Next Generation Application Protocol (NGAP) transport message, wherein the NAS request message is not a NAS Registration Request message, wherein the NGAP transport message includes user location information including a tracking area (TA) identity (TAI) and a cell global identity (CGI) for the UE, wherein the UE is located in a TA indicated by the TAI; determining the TAI received from the RAN node is not part of a registration area (RA) for the UE, wherein the RA comprises one or more TAIs for TAs that the UE is allowed to access without performing Registration with the 5G core network; and sending results of a Registration to the UE including a new RA that comprises an indication of one or more allowed TAs for the UE.

In one implementation, a network node in a 5G core network configured for supporting satellite wireless access by a user equipment (UE) to a serving public land mobile network (PLMN), the network node includes an external interface configured to communicate network entities; at least one memory; at least one processor coupled to the external interface and the at least one memory, wherein the at least one processor is configured to: receive, via the external interface, a non-access stratum (NAS) request message from the UE transported by a Radio Access Network (RAN) node in a Next Generation Application Protocol (NGAP) transport message, wherein the NAS request message is not a NAS Registration Request message, wherein the NGAP transport message includes user location information including a tracking area (TA) identity (TAI) and a cell global identity (CGI) for the UE, wherein the UE is located in a TA indicated by the TAI; determine the TAI received from the RAN node is not part of a registration area (RA) for the UE, wherein the RA comprises one or more TAIs for TAs that the UE is allowed to access without performing Registration with the 5G core network; and send, via the external interface, results of a Registration to the UE including a new RA that comprises an indication of one or more allowed TAs for the UE.

In one implementation, a network node in a 5G core network configured for supporting satellite wireless access by a user equipment (UE) to a serving public land mobile network (PLMN), includes means for receiving a non-access stratum (NAS) request message from the UE transported by a Radio Access Network (RAN) node in a Next Generation Application Protocol (NGAP) transport message, wherein the NAS request message is not a NAS Registration Request message, wherein the NGAP transport message includes user location information including a tracking area (TA) identity (TAI) and a cell global identity (CGI) for the UE, wherein the UE is located in a TA indicated by the TAI; means for determining the TAI received from the RAN node is not part of a registration area (RA) for the UE, wherein the RA comprises one or more TAIs for TAs that the UE is allowed to access without performing Registration with the 5G core network; and means for sending results of a Registration to the UE including a new RA that comprises an indication of one or more allowed TAs for the UE.

In one implementation, a non-transitory storage medium including program code stored thereon, the program code is operable to configure at least one processor in a network node in a 5G core network for supporting satellite wireless access by a user equipment (UE) to a serving public land mobile network (PLMN), the program code comprising instructions to: receive receiving a non-access stratum (NAS) request message from the UE transported by a Radio Access Network (RAN) node in a Next Generation Application Protocol (NGAP) transport message, wherein the NAS request message is not a NAS Registration Request message, wherein the NGAP transport message includes user location information including a tracking area (TA) identity (TAI) and a cell global identity (CGI) for the UE, wherein the UE is located in a TA indicated by the TAI; determine the TAI received from the RAN node is not part of a registration area (RA) for the UE, wherein the RA comprises one or more TAIs for TAs that the UE is allowed to access without performing Registration with the 5G core network; and send results of a Registration to the UE including a new RA that comprises an indication of one or more allowed TAs for the UE.

In one implementation, a method performed by a user equipment (UE) for supporting satellite wireless access to a serving public land mobile network (PLMN), the method includes sending a non-access stratum (NAS) request message to a network node in a 5G core network via a Radio Access Network (RAN) node, wherein the NAS request message is not a NAS Registration Request message, wherein the NAS request message is forwarded to the network node by the RAN node in a Next Generation Application Protocol (NGAP) transport message, wherein the NGAP transport message includes user location information including a tracking area (TA) identity (TAI) and a cell global identity (CGI) for the UE, wherein the TAI is not part of a registration area (RA) for the UE, wherein the RA comprises one or more TAIs for TAs that the UE is allowed to access without performing Registration update with the core network, wherein the UE is located in a TA indicated by the TAI; and receiving from the network node results of a Registration performed by the network node, the results including a new RA that comprises an indication of one or more allowed TAs for the UE.

In one implementation, a user equipment (UE) configured for supporting satellite wireless access to a serving public land mobile network (PLMN), the UE includes a wireless transceiver configured to wirelessly communicate with a communication satellite; at least one memory; at least one processor coupled to the wireless transceiver and the at least one memory, wherein the at least one processor is configured to: send, via the wireless transceiver, a non-access stratum (NAS) request message to a network node in a 5G core network via a Radio Access Network (RAN) node, wherein the NAS request message is not a NAS Registration Request message, wherein the NAS request message is forwarded to the network node by the RAN node in a Next Generation Application Protocol (NGAP) transport message, wherein the NGAP transport message includes user location information including a tracking area (TA) identity (TAI) and a cell global identity (CGI) for the UE, wherein the TAI is not part of a registration area (RA) for the UE, wherein the RA comprises one or more TAIs for TAs that the UE is allowed to access without performing Registration update with the core network, wherein the UE is located in a TA indicated by the TAI; and receive, via the wireless transceiver, from the network node results of a Registration performed by the network node, the results including a new RA that comprises an indication of one or more allowed TAs for the UE.

In one implementation, a user equipment (UE) configured for supporting satellite wireless access to a serving public land mobile network (PLMN), includes means for sending a non-access stratum (NAS) request message to a network node in a 5G core network via a Radio Access Network (RAN) node, wherein the NAS request message is not a NAS Registration Request message, wherein the NAS request message is forwarded to the network node by the RAN node in a Next Generation Application Protocol (NGAP) transport message, wherein the NGAP transport message includes user location information including a tracking area (TA) identity (TAI) and a cell global identity (CGI) for the UE, wherein the TAI is not part of a registration area (RA) for the UE, wherein the RA comprises one or more TAIs for TAs that the UE is allowed to access without performing Registration update with the core network, wherein the UE is located in a TA indicated by the TAI; and means for receiving from the network node results of a Registration performed by the network node, the results including a new RA that comprises an indication of one or more allowed TAs for the UE.

In one implementation, a non-transitory storage medium including program code stored thereon, the program code is operable to configure at least one processor in a user equipment (UE) for supporting satellite wireless access to a serving public land mobile network (PLMN), the program code comprising instructions to: send a non-access stratum (NAS) request message to a network node in a 5G core network via a Radio Access Network (RAN) node, wherein the NAS request message is not a NAS Registration Request message, wherein the NAS request message is forwarded to the network node by the RAN node in a Next Generation Application Protocol (NGAP) transport message, wherein the NGAP transport message includes user location information including a tracking area (TA) identity (TAI) and a cell global identity (CGI) for the UE, wherein the TAI is not part of a registration area (RA) for the UE, wherein the RA comprises one or more TAIs for TAs that the UE is allowed to access without performing Registration update with the core network, wherein the UE is located in a TA indicated by the TAI; and receive from the network node results of a Registration performed by the network node, the results including a new RA that comprises an indication of one or more allowed TAs for the UE.

Figure 1:
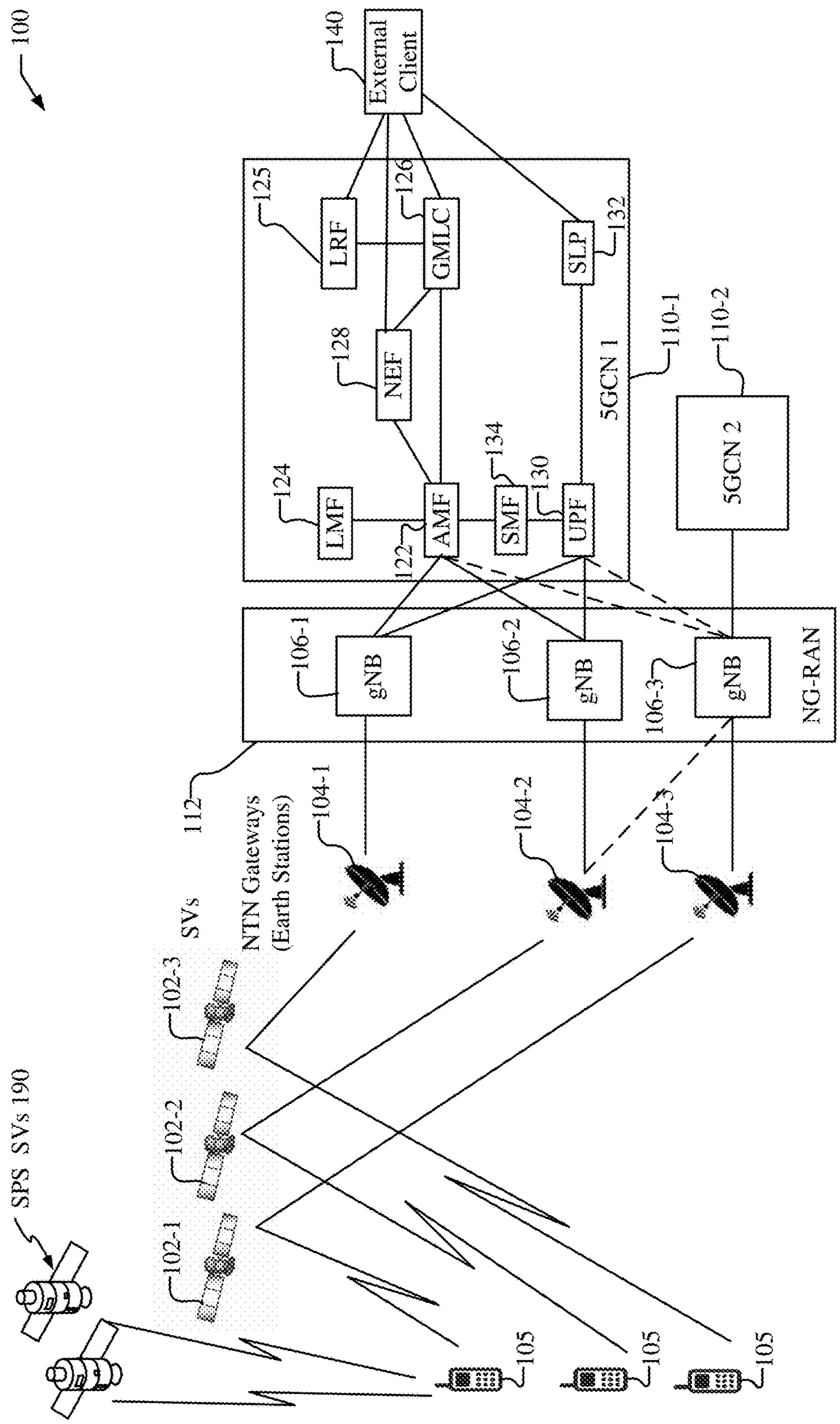
FIG. 1 shows a diagram of a communication system with a network architecture having transparent space vehicles (SVs) that is capable of supporting satellite access to a wireless network.

Like reference symbols in the various drawings indicate like elements, in accordance with certain example implementations. In addition, multiple instances of an element may be indicated by following a first number for the element with a letter or a hyphen and a second number. For example, multiple instances of an element 102 may be indicated as 102-1, 102-2, 102-3 etc. When referring to such an element using only the first number, any instance of the element is to be understood (e.g. element 102 in the previous example would refer to elements 102-1, 102-2, 102-3).

DETAILED DESCRIPTION

Satellites, also referred to as space vehicles (SVs) or communication satellites, may be used in communication systems, for example, using gateways and one or more satellites to relay communication signals between the gateways and one or more UEs. A UE, for example, may access a satellite (instead of a terrestrial base station) which may be connected to an earth station (ES), which is also referred to as a ground station or Non-Terrestrial Network (NTN) Gateway. The earth station in turn would connect to an element in a network such as a modified base station (without a terrestrial antenna) or a network node in a Core Network (CN). This element would in turn provide access to other elements in the network and ultimately to entities external to the network such as Internet web servers and other user devices.

A rationale for satellite access for UEs may include ubiquitous outdoor coverage for both users and Mobile Network Operators (MNOs). For example, in many countries, including the United States, unavailable or poor cellular coverage is a common problem. Moreover, cellular access is not always possible even when there is normally good cellular coverage. For example, cellular access may be hampered due to congestion, physical obstacles, a local cellular outage caused by weather (e.g. a hurricane or tornado), or a local power outage. Satellite access to cellular networks could provide a new independent access potentially available everywhere outdoors. Current satellite capable phones for low Earth orbit (LEO) SVs may be of similar size to a cellular smartphone and, thus, mobile NR support with satellite capable phones need not produce a significant increase in the size of phones. Moreover, satellite capable smartphones may help drive handset sales, and may add revenue for carriers. Potential users, for example, may include anyone with limited or no cellular access, anyone wanting a backup to a lack of cellular access, and anyone involved in public safety or who otherwise needs (nearly) 100% reliable mobile communication. Additionally, some users may desire an improved or more reliable emergency (e.g. E911) service, e.g., for a medical emergency or vehicle trouble in remote areas.

The use of satellite access may provide other benefits. For example, satellite access may reduce Mobile Network Operator (MNO) infrastructure cost. For example, an MNO may use satellite access to reduce terrestrial base stations, such as NR NodeBs, also referred to as gNBs, and backhaul deployment in sparsely populated areas. Further, satellite access may be used to overcome internet blockage, e.g., in certain countries. Additionally, satellite access may provide diversification to Space Vehicle Operators (SVOs). For example, 5G NR satellite access could provide another revenue stream to SVOs who would otherwise provide fixed Internet access.

Terrestrial networks (TNs) using terrestrial cellular base stations can support relatively small fixed radio cells (e.g. 100 meters to 10 kms from one side to another) which can have accurately known geographic coverage areas. This allows an operator of a TN to subdivide their overall service area into fixed tracking areas (TAs) which are each composed of a number of fixed radio cells. Tracking areas allow an operator to control access by users (e.g. define certain geographic areas which can only be accessed by a subset of users) and to charge users based on their general location. Radio cells allow an operator a fine level of access control and fine level of charging discrimination and can be used for routing purposes and to support wireless emergency alerting (WEA). For example, a request to set up an emergency call sent by a UE to a TN can include the current serving radio cell of the UE which can be used by the TN to route the emergency call to a Public Safety Answering Point (PSAP), which serves the area of the serving radio cell. In addition, when a WEA message needs to be broadcast in a predefined target area to all UEs currently located in the target area, the TN may direct the WEA message to be broadcast only within radio cells whose coverage areas are within or partly within the target area.

Satellite access for UEs is being defined by the Third Generation Partnership Project (3GPP). A main objective in defining the satellite access is to minimize or avoid new impacts to a CN. One way to avoid or minimize impact to the CN is to retain support for fixed tracking areas (TAs). The fixed TAs could be defined geographically by Operations and Maintenance (O&M) with the geographic definitions being provided to base stations (e.g. eNBs and/or gNBs) and the CN. A base station may then determine the fixed TA in which a UE is located based on a current UE geographic location and may provide an identifier (ID) for this TA to a network node in the CN, e.g., an Access and Mobility Management Function (AMF), when a signaling connection is established for the UE. The network node may later use the fixed TA information to send a paging message to the UE via one or more base stations. Use of fixed TAs may have a benefit of reducing or minimizing new CN impacts.

Accordingly, as discussed herein in one implementation, a core network node, such as an AMF may receive a non-access stratum (NAS) request from a UE that is transported by a Radio Access Network (RAN) node, such as a gNB, in a Next Generation Application Protocol (NGAP) transport message. The NGAP transport message may indicate a tracking area (TA) code (TAC) and/or a tracking area identity (TAI) and a cell global identity (CGI) for the UE. The AMF may determine whether the received TAC and/or TAI is for a TA that is part of a current registration area (RA) for the UE. A RA, for example, includes one or more TAs that the UE is allowed to access without performing Registration with the core network. If the AMF determines that the TAC and/or TAI is for a TA that is not part of the current RA for the UE, the AMF may perform a Registration of the UE and sends the results of the Registration to the UE including a new RA that comprises an indication of one or more allowed TAs for the UE. The AMF may perform an immediate Registration, e.g., by rejecting the NAS request from the UE and sending an indication to the UE to Register. The UE may perform a deferred Registration, e.g., by performing the NAS procedures associated with the NAS request and sending an indication to the UE to Register. For the immediate Registration and deferred Registration, the UE sends a Registration request to the AMF and the AMF performs the registration and sends the results of the Registration to the UE in a Registration accept message. The AMF may perform an implicit Registration, where the AMF performs Registration without receiving a Registration request from the UE.

FIG. 1 illustrates an example network architecture 100 capable of supporting satellite access using 5G New Radio (NR). FIG. 1 illustrates a network architecture with transparent space vehicles (SVs). A transparent SV may implement frequency conversion and a radio frequency (RF) amplifier in both uplink (UL) and downlink (DL) directions and may correspond to an analog RF repeater. A transparent SV, for example, may receive uplink (UL) signals from all served UEs and may redirect the combined signals DL to an earth station without demodulating or decoding the signals. Similarly, a transparent SV may receive an UL signal from an earth station and redirect the signal DL to served UEs without demodulating or decoding the signal. However, the SV may frequency convert received signals and may amplify and/or filter received signals before transmitting the signals.

The network architecture 100 comprises a number of UEs 105, a number of SVs 102-1 to 102-3 (collectively referred to herein as SVs 102), a number of Non-Terrestrial Network (NTN) gateways 104-1 to 104-3 (collectively referred to herein as NTN gateways 104) (sometimes referred to herein simply as gateways 104, earth stations 104, or ground stations 104), a number of NR NodeBs (gNB s) 106-1 to 106-3 (collectively referred to herein as gNBs 106) capable of communication with UEs via SVs 102 and that are part of a Next Generation (NG) Radio Access Network (RAN) (NG-RAN) 112. It is noted that the term gNB refers in general to an enhanced gNB with support for SVs and may be referred to as a gNB (e.g. in 3GPP) or sometimes may be referred to as a satellite NodeB (sNB). The network architecture 100 is illustrated as further including components of a number of Fifth Generation (5G) networks including 5G Core Networks (5GCNs) 110-1 and 110-2 (collectively referred to herein as 5GCNs 110). The 5GCNs 110 may be public land mobile networks (PLMN) that may be located in the same or in different countries. FIG. 1 illustrates various components within 5GCN1 110-1 that may operate with the NG-RAN 112. It should be understood that 5GCN2 110-2 and other 5GCNs may include identical, similar or different components and associated NG-RANs, which are not illustrated in FIG. 1 in order to avoid unnecessary obfuscation. A 5G network may also be referred to as a New Radio (NR) network; NG-RAN 112 may be referred to as a 5G RAN or as an NR RAN; and 5GCN 110 may be referred to as an NG Core network (NGC).

The network architecture 100 may further utilize information from space vehicles (SVs) 190 for Satellite Positioning System (SPS) including Global Navigation Satellite Systems (GNSS) like Global Positioning System (GPS), GLObal NAvigation Satellite System (GLONASS), Galileo or Beidou or some other local or regional SPS, such as Indian Regional Navigation Satellite System (IRNSS), European Geostationary Navigation Overlay Service (EGNOS), or Wide Area Augmentation System (WAAS), all of which are sometimes referred to herein as GNSS. It is noted that SVs 190 act as navigation SVs and are separate and distinct from SVs 102, which act as communication SVs. However, it is not precluded that some of SVs 190 may also act as some of SVs 102 and/or that some of SVs 102 may also act as some of SVs 190. In some implementations, for example, the SVs 102 may be used for both communication and positioning. Additional components of the network architecture 100 are described below. The network architecture 100 may include additional or alternative components.

Permitted connections in the network architecture 100 having the network architecture with transparent SVs illustrated in FIG. 1, allow a gNB 106 to access multiple Earth stations 104 and/or multiple SVs 102. A gNB 106, e.g., illustrated by gNB 106-3, may also be shared by multiple PLMNs (5GCNs 110), which may all be in the same country or possibly in different countries, and an Earth station 104, e.g., illustrated by Earth station 104-2, may be shared by more than one gNB 106.

It should be noted that FIG. 1 provides only a generalized illustration of various components, any or all of which may be utilized as appropriate, and each of which may be duplicated or omitted, as necessary. Specifically, although only three UEs 105 are illustrated, it will be understood that many UEs (e.g., hundreds, thousands, millions, etc.) may utilize the network architecture 100. Similarly, the network architecture 100 may include a larger (or smaller) number of SVs 190, SVs 102, earth stations 104, gNBs 106, NG-RAN 112, 5GCNs 110, external clients 140, and/or other components. The illustrated connections that connect the various components in the network architecture 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used to support satellite wireless access (e.g. using SVs 102) for other communication technologies, such as 3G, 4G Long Term Evolution (LTE), etc.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a cellphone, smartphone, laptop, tablet, PDA, tracking device, navigation device, Internet of Things (IoT) device, or some other portable or moveable device. Typically, though not necessarily, the UE 105 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 112 and 5GCN 140), etc. The UE 105 may also support wireless communication using a Wireless Local Area Network (WLAN) which may connect to other networks (e.g. the Internet) using a Digital Subscriber Line (DSL) or packet cable for example. The UE 105 further supports wireless communications using space vehicles, such as SVs 102. The use of one or more of these RATs may allow the UE 105 to communicate with an external client 140 (via elements of 5GCN 110 not shown in FIG. 1, or possibly via a Gateway Mobile Location Center (GMLC) 126).

The UE 105 may include a single entity or may include multiple entities such as in a personal area network where a user may employ audio, video and/or data I/O devices and/or body sensors and a separate wireline or wireless modem.

The UE 105 may support position determination, e.g., using signals and information from space vehicles 190 in an SPS, such as GPS, GLONASS, Galileo or Beidou or some other local or regional SPS such as IRNSS, EGNOS or WAAS, all of which may be generally referred to herein as GNSS. Position measurements using SPS are based on measurements of propagation delay times of SPS signals broadcast from a number of orbiting satellites to a SPS receiver in the UE 105. Once the SPS receiver has measured the signal propagation delays for each satellite, the range to each satellite can be determined and precise navigation information including 3-dimensional position, velocity, and time of day of the SPS receiver can then be determined using the measured ranges and the known locations of the satellites. Positioning methods which may be supported using SVs 190 may include Assisted GNSS (A-GNSS), Real Time Kinematic (RTK), Precise Point Positioning (PPP) and Differential GNSS (DGNSS). Information and signals from SVs 102 may also be used to support positioning. The UE 105 may further support positioning using terrestrial positioning methods, such as Observed Time Difference of Arrival (OTDOA), Enhanced Cell ID (ECID), Round Trip signal propagation Time (RTT), multi-cell RTT, angle of arrival (AOA), angle of departure (AOD), time of arrival (TOA), receive-transmit transmission-time difference (Rx-Tx) and/or other positioning methods.

An estimate of a location of the UE 105 may be referred to as a geodetic location, location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.) A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

The UEs 105 are configured to communicate with 5GCNs 110 via the SVs 102, earth stations 104, and gNBs 106. As illustrated by NG-RAN 112, the NG-RANs associated with the 5GCNs 110 may include one or more gNBs 106. The NG-RAN 112 may further include a number of terrestrial base stations, e.g., gNBs (not shown) that are not capable of communication with UEs via SVs 102 (not shown). Pairs of terrestrial and/or satellite base stations, e.g., gNBs and gNB 106-1 in NG-RAN 112 may be connected to one another using terrestrial links—e.g. directly or indirectly via other gNBs or gNBs 106 and communicate using an Xn interface. Access to the 5G network is provided to UEs 105 via wireless communication between each UE 105 and a serving gNB 106, via an SV 102 and an earth station 104. The gNBs 106 may provide wireless communications access to the 5GCN 110 on behalf of each UE 105 using 5G NR. 5G NR radio access may also be referred to as NR radio access or as 5G radio access and may be as defined by the Third Generation Partnership Project (3GPP).

Base stations (BSs) in the NG-RAN 112 shown in FIG. 1 may also or instead include a next generation evolved Node B, also referred to as an ng-eNB. An ng-eNB may be connected to one or more gNBs 106 and/or gNBs in NG-RAN 112—e.g. directly or indirectly via other gNBs 106, gNBs and/or other ng-eNBs. An ng-eNB may provide LTE wireless access and/or evolved LTE (eLTE) wireless access to a UE 105.

A gNB 106 may be referred to by other names such as a gNB or a "satellite node" or "satellite access node." The gNBs 106 are not the same as terrestrial gNBs, but may be based on a terrestrial gNB with additional capability. For example, a gNB 106 may terminate the radio interface and associated radio interface protocols to UEs 105 and may transmit DL signals to UEs 105 and receive UL signals from UEs 105 via SVs 102 and earth stations (ESs) 104. A gNB 106 may also support signaling connections and voice and data bearers to UEs 105 and may support handover of UEs 105 between different radio cells for the same SV 102, between different SVs 102 and/or between different gNBs 106. In some systems, a gNB 106 may be referred to as a gNB or as an enhanced gNB. GNBs 106 may be configured to manage moving radio beams (for LEO SVs) and associated mobility of UEs 105. The gNBs 106 may assist in the handover (or transfer) of SVs 102 between different Earth stations 104, different gNBs 106, and between different countries. The gNBs 106 may hide or obscure specific aspects of connected SVs 102 from the 5GCN 110, e.g. by interfacing to a 5GCN 110 in the same way or in a similar way to a terrestrial gNB, and may avoid a 5GCN 110 from having to maintain configuration information for SVs 102 or perform mobility management related to SVs 102. The gNBs 106 may further assist in sharing of SVs 102 over multiple countries. The gNBs 106 may communicate with one or more earth stations 104, e.g., as illustrated by gNB 106-2 communicating with earth stations 104-2 and 104-1. The gNBs 106 may be separate from earth stations 104. The gNBs 106 alternatively may include or may be combined with one or more earth stations 104, e.g., using a split architecture. For example, with a split architecture, a gNB 106 may include a Central Unit and an earth station may act as Distributed Unit (DU). A gNB 106 may typically be fixed on the ground with transparent SV operation. In one implementation, one gNB 106 may be physically combined with, or physically connected to, one earth station 104 to reduce complexity and cost.

The earth stations 104 may be shared by more than one gNB 106 and may communicate with UE 105 via the SVs 102. An earth station 104 may be dedicated to just one SVO and to one associated constellation of SV 102 and hence may be owned and managed by the SVO. Earth stations 104 may be included within a gNB 106, e.g., as a gNB-DU within a gNB 106, which may occur when the same SVO or the same MNO owns both the gNB 106 and the included earth stations 104. Earth stations 104 may communicate with SVs 102 using control and user plane protocols that may be proprietary to an SVO. The control and user plane protocols between earth stations 104 and SVs 102 may: (i) establish and release Earth Station 104 to SV 102 communication links, including authentication and ciphering; (ii) update SV software and firmware; (iii) perform SV Operations and Maintenance (O&M); (iv) control radio beams (e.g., direction, power, on/off status) and mapping between radio beams and earth station uplink (UL) and downlink (DL) payload; and (v) assist with handoff of an SV 102 or radio cell to another Earth station 104.

As noted, while FIG. 1 depicts nodes configured to communicate according to 5G NR communication protocols for an NG-RAN 112, nodes configured to communicate according to other communication protocols may be used, such as, for example, an LTE protocol for an Evolved Universal Mobile Telecommunications System (UMTS) Terrestrial Radio Access Network (E-UTRAN), a Narrow Band Internet of Things (NB-IoT) protocol for an E-UTRAN supporting low bandwidth access using a variant of LTE, or an IEEE 802.11x protocol for a WLAN. For example, in a 4G Evolved Packet System (EPS) providing LTE wireless access to UE 105, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 112 and the EPC corresponds to 5GCN 110 in FIG. 1. The methods and techniques described herein for support of fixed TAs and Registration of a UE based on fixed TAs may be applicable to such other networks.

The gNBs 106 in the NG-RAN 112 may communicate with the AMF 122 in a 5GCN 110, which, for positioning functionality, may communicate with a Location Management Function (LMF) 124. For example, the gNBs 106 may provide an N2 interface to the AMF 122. An N2 interface between a gNB 106 and a 5GCN 110 may be the same as or similar to an N2 interface supported between a terrestrial gNB and a 5GCN 110 for terrestrial NR access by a UE 105 and may use the Next Generation Application Protocol (NGAP) defined in 3GPP Technical Specification (TS) 38.413 between a gNB 106 and the AMF 122. The AMF 122 may support mobility of the UE 105, including radio cell change and handover and may participate in supporting a signaling connection to the UE 105 and possibly data and voice bearers for the UE 105. The LMF 124 may support positioning of the UE 105 when UE accesses the NG-RAN 112 and may support position procedures/methods such as A-GNSS, OTDOA, RTK, PPP, DGNSS, ECID, AOA, AOD, multi-cell RTT and/or other positioning procedures including positioning procedures based on communication signals from one or more SVs 102. The LMF 124 may also process location services requests for the UE 105, e.g., received from the AMF 122 or from a Gateway Mobile Location Center (GMLC) 126. The LMF 124 may be connected to AMF 122 and/or to GMLC 126. In some embodiments, a node/system that implements the LMF 124 may additionally or alternatively implement other types of location-support modules, such as an Enhanced Serving Mobile Location Center (E-SMLC). It is noted that in some embodiments, at least part of the positioning functionality (including derivation of a UE 105's location) may be performed at the UE 105 (e.g., using signal measurements obtained by UE 105 for signals transmitted by SVs 102, SVs 190, gNBs and assistance data provided to the UE 105, e.g. by LMF 124).

The GMLC 126 may support a location request for the UE 105 received from an external client 140 and may forward such a location request to the AMF 122 for forwarding by the AMF 122 to the LMF 124. A location response from the LMF 124 (e.g. containing a location estimate for the UE 105) may be similarly returned to the GMLC 126 via the AMF 122, and the GMLC 126 may then return the location response (e.g., containing the location estimate) to the external client 140. The GMLC 126 is shown connected to only the AMF 122 in FIG. 1 though in some implementations may be connected to both the AMF 122 and the LMF 124 and may support direct communication between the GMLC 126 and LMF 124 or indirect communication, e.g. via the AMF 122.

A Network Exposure Function (NEF) 128 may be included in 5GCN 110, e.g., connected to the GMLC 126 and the AMF 122. In some implementations, the NEF 128 may be connected to communicate directly with the external client 140. The NEF 128 may support secure exposure of capabilities and events concerning 5GCN 110 and UE 105 to an external client 140 and may enable secure provision of information from external client 140 to 5GCN 110.

A User Plane Function (UPF) 130 may support voice and data bearers for UE 105 and may enable UE 105 voice and data access to other networks such as the Internet. The UPF 130 may be connected to gNB s 106 and gNB s. UPF 130 functions may include: external Protocol Data Unit (PDU) session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 130 may be connected to a Secure User Plane Location (SUPL) Location Platform (SLP) 132 to enable support of positioning of UE 105 using SUPL. SLP 132 may be further connected to or accessible from external client 140.

As illustrated, a Session Management Function (SMF) 134 connects to the AMF 122 and the UPF 130. The SMF 134 may have the capability to control both a local and a central UPF within a PDU session. SMF 134 may manage the establishment, modification, and release of PDU sessions for UE 105, perform IP address allocation and management for UE 105, act as a Dynamic Host Configuration Protocol (DHCP) server for UE 105, and select and control a UPF 130 on behalf of UE 105.

The external client 140 may be connected to the core network 110 via the GMLC 126 and/or the SLP 132, and in some implementations, the NEF 128. The external client 140 may optionally be connected to the core network 110 and/or to a location server, which may be, e.g., an SLP, that is external to 5GCN 110, via the Internet. The external client 140 may be connected to the UPF 130 directly (not shown in FIG. 1) or through the Internet. The external client 140 may be a server, a web server, or a user device, such as a personal computer, a UE, etc.

A Location Retrieval Function (LRF) 125 may be connected to the GMLC 126, as illustrated, and in some implementations, to the SLP 132, as defined in 3GPP Technical Specification (TS) 23.167. LRF 125 may perform the same or similar functions to GMLC 126, with respect to receiving and responding to a location request from an external client 140 that corresponds to a Public Safety Answering Point (PSAP) supporting an emergency call from UE 105. One or more of the GMLC 126, LRF 125, and SLP 132 may be connected to the external client 140, e.g., through another network, such as the Internet.

The AMF 122 may normally support network access and registration by UEs 105, mobility of UEs 105, including radio cell change and handover and may participate in supporting a signaling connection to a UE 105 and possibly data and voice bearers for a UE 105. The role of an AMF 122 may be to Register the UE during a Registration process, as discussed herein. The AMF 122 may page the UE 105, e.g., by sending a paging message via one or more radio cells in the tracking area in which the UE 105 is located.

Network architecture 100 may be associated with or have access to space vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. UEs 105 may obtain location measurements for signals transmitted by SVs 190 and/or by base stations and access points such as eNBs, ng-eNB, gNB, and/or SVs 102 which may enable a UE 105 to determine a location estimate for UE 105 or to obtain a location estimate for UE 105 from a location server in 5GCN 110, e.g., LMF 124. For example, UE 105 may transfer location measurements to the location server to compute and return the location estimate. UEs 105 (or the LMF 124) may obtain a location estimate for UE 105 using position methods such as GPS, Assisted GPS (A-GPS), Assisted GNSS (A-GNSS), Observed Time Difference of Arrival (OTDOA), Enhanced Cell ID (ECID), multi-cell RTT, Wireless Local Area Network (WLAN) positioning (e.g. using signals transmitted by IEEE 802.11 WiFi access points), sensors (e.g. inertial sensors) in UE 105, or some (hybrid) combination of these. A UE 105 may use a location estimate for the UE 105 during Registration.

As noted, while the network architecture 100 is described in relation to 5G technology, the network architecture 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GCN 110 may be configured to control different air interfaces. For example, in some embodiments, 5GCN 110 may be connected to a WLAN, either directly or using a Non-3GPP InterWorking Function (N3IWF, not shown FIG. 1) in the 5GCN 110. For example, the WLAN may support IEEE 802.11 WiFi access for UE 105 and may comprise one or more WiFi APs. Here, the N3IWF may connect to the WLAN and to other elements in the 5GCN 110 such as AMF 122.

Figure 2:
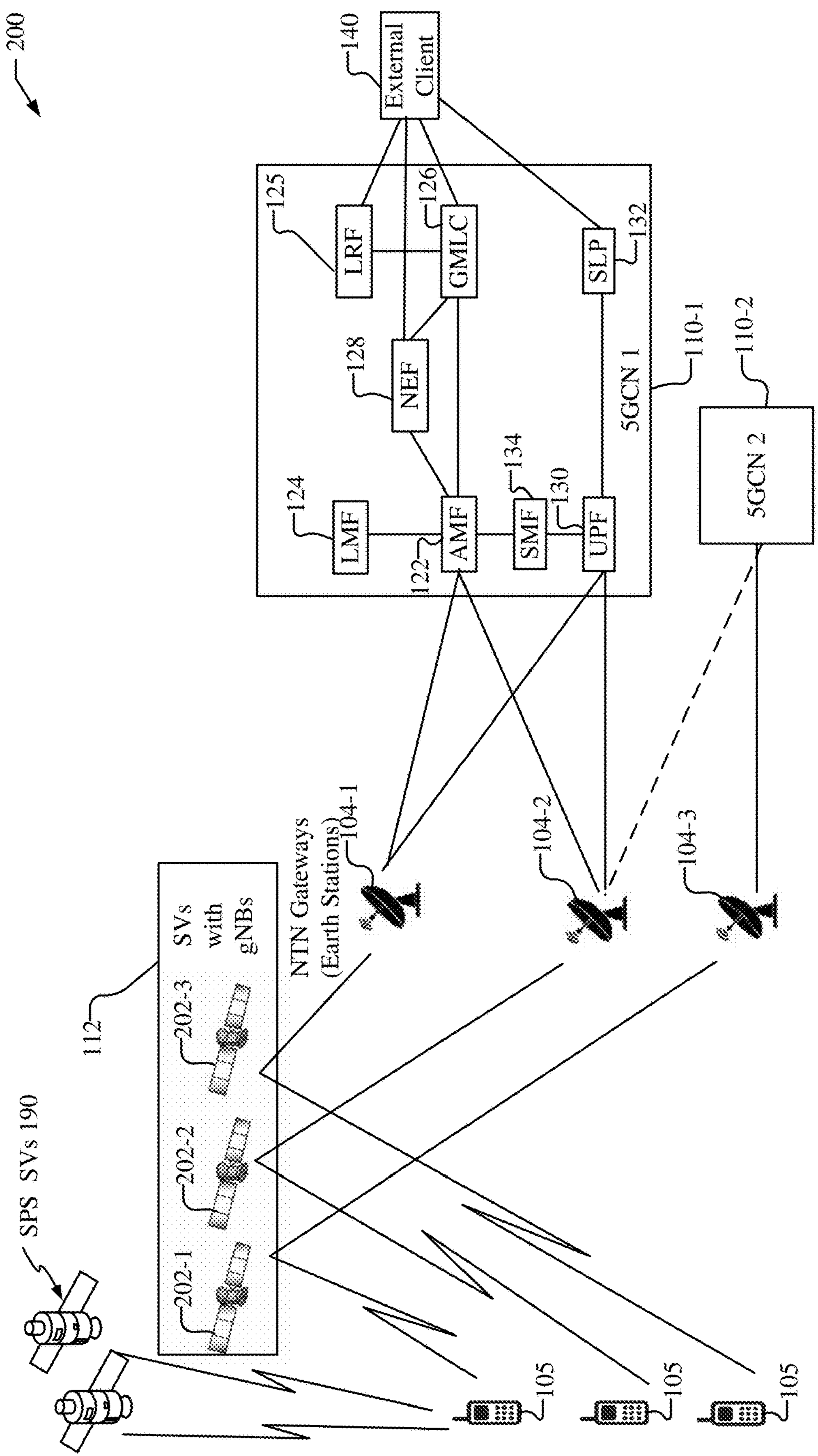
FIG. 2 shows a diagram of a communication system with a network architecture having regenerative SVs that is capable of supporting satellite access to a wireless network.

FIG. 2 shows a diagram of a network architecture 200 capable of supporting satellite access using 5G New Radio (NR) as discussed herein. The network architecture shown in FIG. 2 is similar to that shown in FIG. 1, like designated elements being similar or the same. FIG. 2, however, illustrates a network architecture with regenerative SVs 202-1, 202-2, and 202-3 (collectively SVs 202), as opposed to transparent SVs 102 shown in FIG. 1. A regenerative SV 202, unlike a transparent SV 102, includes an on-board gNB 202 (e.g. includes the functional capability of a gNB), and is sometimes referred to herein as an SV/gNB 202. The NG-RAN 112 is illustrated as including the SV/gNBs 202. Reference to a gNB 202 is used herein when referring to SV/gNB 202 functions related to communication with UEs 105 and 5GCNs 110, whereas reference to an SV 202 is used when referring to SV/gNB 202 functions related to communication with earth stations 104 and with UEs 105 at a physical radio frequency level. However, there may be no precise delimitation of an SV 202 versus a gNB 202.

An onboard gNB 202 may perform many of the same functions as a gNB 106 as described previously. For example, a gNB 202 may terminate the radio interface and associated radio interface protocols to UEs 105 and may transmit DL signals to UEs 105 and receive UL signals from UEs 105, which may include encoding and modulation of transmitted signals and demodulation and decoding of received signals. A gNB 202 may also support signaling connections and voice and data bearers to UEs 105 and may support handover of UEs 105 between different radio cells for the same gNB 202 and between different gNBs 202. The gNBs 202 may assist in the handover (or transfer) of SVs 202 between different Earth stations 104, different 5GCNs 110, and between different countries. The gNBs 202 may hide or obscure specific aspects of SVs 202 from the 5GCN 110, e.g. by interfacing to a 5GCN 110 in the same way or in a similar way to a terrestrial gNB. The gNBs 202 may further assist in sharing of SVs 202 over multiple countries. The gNBs 202 may communicate with one or more earth stations 104 and with one or more 5GCNs 110 via the earth stations 104. In some implementations, gNBs 202 may communicate directly with other gNBs 202 using Inter-Satellite Links (ISLs) (not shown in FIG. 2), which may support an Xn interface between any pair of gNBs 202.

With LEO SVs, an SV/gNB 202 needs to manage moving radio cells with coverage in different countries at different times. Earth stations 104 may be connected directly to the 5GCN 110, as illustrated. For example, as illustrated, earth station 104-1 may be connected to AMF 122 and UPF 130 of 5GCN1 110-1, while earth station 104-2 may be similarly connected to 5GCN1 110-1 and 5GNC2 110-2, and earth station 104-3 is connected to 5GCN2 110-2. The earth stations 104 may be shared by multiple 5GCNs 110, for example, if Earth stations 104 are limited. For example, in some implementations (illustrated with dotted lines), earth station 104-2 may be connected to both 5GCN1 110-1 and 5GCN2 110-2. The 5GCN 110 may need to be aware of SV 202 coverage areas in order to page UEs 105 and to manage handover. Thus, as can be seen, the network architecture with regenerative SVs may have more impact and complexity with respect to both gNBs 202 and 5GCNs 110 than the network architecture with transparent SVs 102 shown in FIG. 1.

Figure 3:
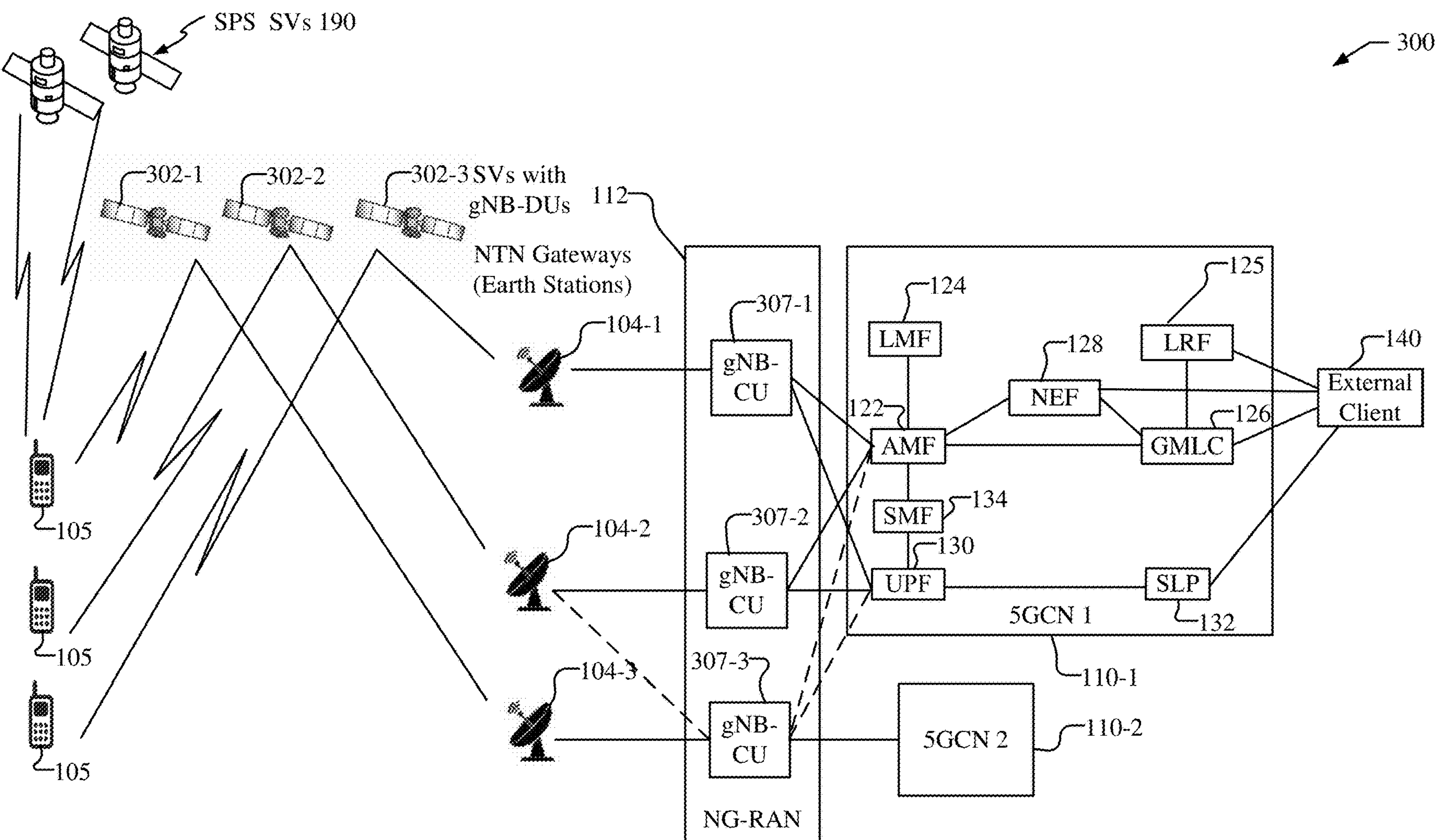
FIG. 3 shows a diagram of a communication system with a network architecture having regenerative SVs and a split satellite Node B (sNB) architecture that is capable of supporting satellite access to a wireless network.

FIG. 3 shows a diagram of a network architecture 300 capable of supporting satellite access using 5G New Radio (NR) as discussed herein. The network architecture shown in FIG. 3 is similar to that shown in FIGS. 1 and 2, like designated elements being similar or the same. FIG. 3, however, illustrates a network architecture with regenerative SVs 302-1, 302-2, and 302-3 (collectively referred to as SVs 302), as opposed to transparent SVs 102 shown in FIG. 1, and with a split architecture for the gNBs. The gNBs 307 include a central unit and may sometimes be referred as gNB-CU 307, and a regenerative SV 302, unlike a transparent SV 102, includes an on-board gNB Distributed Unit (gNB-DU) 302, and is sometimes referred to herein as an SV/gNB-DU 302. Reference to a gNB-DU 302 is used herein when referring to SV/gNB 302 functions related to communication with UEs 105 and gNB-CUs 307, whereas reference to an SV 302 is used when referring to SV/gNB-DU 302 functions related to communication with earth stations 104 and with UEs 105 at a physical radio frequency level. However, there may be no precise delimitation of an SV 302 versus a gNB-DU 302.

Each gNB-DU 302 communicates with one ground based gNB-CU 307 via one or more earth stations 104. One gNB-CU 307 together with the one or more gNB-DUs 302 which are in communication with the gNB-CU 307 performs functions, and may use internal communication protocols, which are similar to or the same as a terrestrial gNB with a split architecture as described in 3GPP TS 38.401. Here a gNB-DU 302 corresponds to and performs functions similar to or the same as a terrestrial gNB Distributed Unit (gNB-DU) defined in TS 38.401, while a gNB-CU 307 corresponds to and performs functions similar to or the same as a terrestrial gNB Central Unit (gNB-CU) defined in TS 38.401. For example, a gNB-DU 302 and a gNB-CU 307 may communicate with one another using an F1 Application Protocol (FLAP) as defined in 3GPP TS 38.473 and together may perform some or all of the same functions as a gNB 106 or gNB 202 as described previously. To simplify references to different types of gNB is the description below, a gNB-DU 302 may sometimes be referred to a gNB 302 (without the "DU" label), and a gNB-CU 307 may sometimes be referred to a gNB 307 (without the "CU" label).

A gNB-DU 302 may terminate the radio interface and associated lower level radio interface protocols to UEs 105 and may transmit DL signals to UEs 105 and receive UL signals from UEs 105, which may include encoding and modulation of transmitted signals and demodulation and decoding of received signals. A gNB-DU 302 may support and terminate Radio Link Control (RLC), Medium Access Control (MAC) and Physical (PHY) protocol layers for the NR Radio Frequency (RF) interface to UEs 105, as defined in 3GPP TSs 38.201, 38.202, 38.211, 38.212, 38.213, 38.214, 38.215, 38.321 and 38.322. The operation of a gNB-DU 302 is partly controlled by the associated gNB-CU 307. One gNB-DU 307 may support one or more NR radio cells for UEs 105. A gNB-CU 307 may support and terminate a Radio Resource Control (RRC) protocol, Packet Data Convergence Protocol (PDCP) and Service Data Protocol (SDAP) for the NR RF interface to UEs 105, as defined in 3GPP TSs 38.331, 38.323, and 37.324, respectively. A gNB-CU 307 may also be split into separate control plane (gNB-CU-CP) and user plane (gNB-CU-UP) portions, where a gNB-CU-CP communicates with one or more AMFs 122 in one more 5GCNs 110 using the NGAP protocol and where a gNB-CU-UP communicates with one or more UPFs 130 in one more 5GCNs 110 using a General Packet Radio System (GPRS) tunneling protocol (GTP) user plane protocol (GTP-U) as defined in 3GPP TS 29.281. A gNB-DU 302 and gNB-CU 307 may communicate over an F1 interface to (a) support control plane signaling for a UE 105 using Internet Protocol (IP), Stream Control Transmission Protocol (SCTP) and F1 Application Protocol (FLAP) protocols, and (b) to support user plane data transfer for a UE using IP, User Datagram Protocol (UDP), PDCP, SDAP, GTP-U and NR User Plane Protocol (NRUPP) protocols.

A gNB-CU 307 may communicate with one or more other gNB-CUs 307 and/or with one more other terrestrial gNBs using terrestrial links to support an Xn interface between any pair of gNB-CUs 302 and/or between any gNB-CU 307 and any terrestrial gNB.

A gNB-DU 302 together with a gNB-CU 307 may: (i) support signaling connections and voice and data bearers to UEs 105; (ii) support handover of UEs 105 between different radio cells for the same gNB-DU 302 and between different gNB-DUs 302; and (iii) assist in the handover (or transfer) of SVs 302 between different Earth stations 104, different 5GCNs 110, and between different countries. A gNB-CU 307 may hide or obscure specific aspects of SVs 302 from a 5GCN 110, e.g. by interfacing to a 5GCN 110 in the same way or in a similar way to a gNB. The gNB-CUs 307 may further assist in sharing of SVs 302 over multiple countries.

In network architecture 300, the gNB-DUs 302 that communicate with and are accessible from any gNB-CU 307 will change over time with LEO SVs 302. With the split gNB architecture, a 5GCN 110 may connect to fixed gNB-CUs 307 which do not change over time and which may reduce difficulty with paging of a UE 105. For example, a 5GCN 110 may not need to know which SV/gNB-DUs 302 are needed for paging a UE 105. The network architecture with regenerative SVs 302 with a split gNB architecture may thereby reduce 5GCN 110 impact at the expense of additional impact to a gNB-CU 307.

While supporting satellite access to a wireless network, an SV 102/202/302 may transmit radio beams (also referred to just as "beams") over multiple countries. For example, a beam transmitted by an SV 102/202/302 may overlap two or more countries. Sharing a beam over two or more countries, however, may raise complications. For example, if a beam is shared by two or more countries, earth stations 104 and gNBs 106/202/302/307 in one country may need to support UE 105 access from other countries. Sharing a beam over multiple countries may raise security issues for privacy of both data and voice. Further, sharing an SV beam over multiple countries may raise regulatory conflicts. For example, regulatory services including WEA, Lawful Interception (LI), and emergency (EM) calls in a first country may need support from gNBs 106/202/307 and earth stations 104 in a second country that shares the same SV beam.

Figure 4:
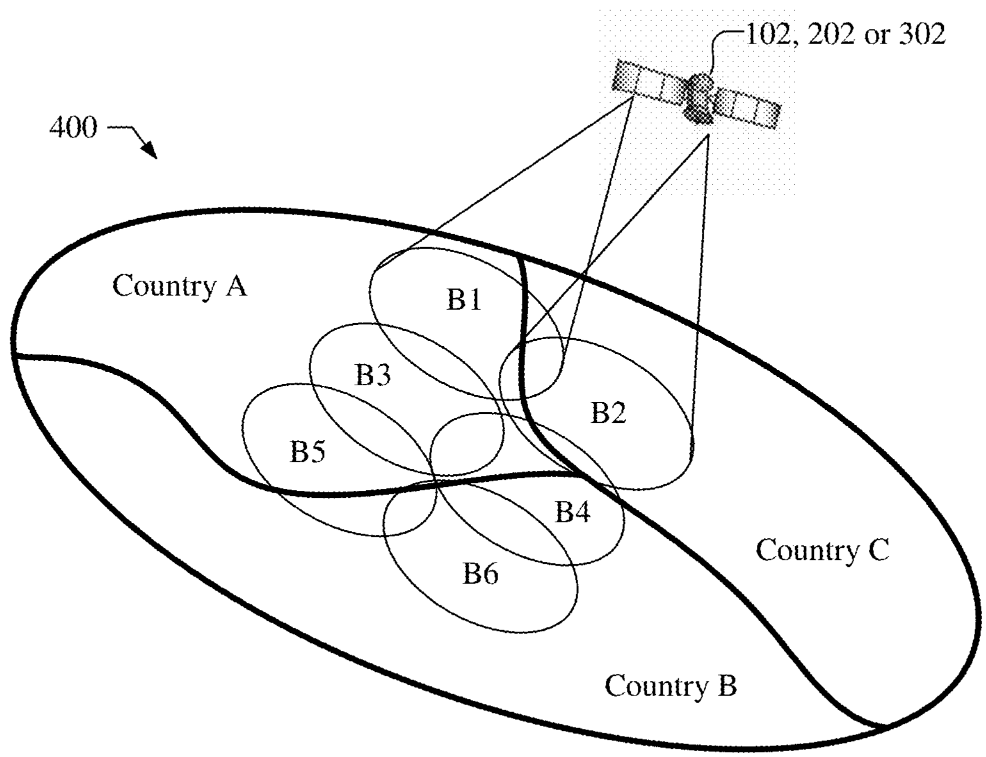
FIG. 4 illustrates an SV generating multiple beams over an area that includes multiple countries.

FIG. 4, by way of example, illustrates an SV 102, 202, 302 generating multiple beams identified as beams B1, B2, B3, B4, B5, and B6 over an area 400 that includes portions of multiple countries, e.g., country A, country B, and country C. With the assignment of each beam to just one country, beams B1, B3, B5 could be assigned to country A, beams B4 and B6 could be assigned to country B, and beam B2 could be assigned to country C.

In one implementation, an individual beam may be assigned to a single country by controlling or steering the beam. While a Non-Geostationary Earth Orbiting (NGEO) SV has a moving coverage area, a relative beam direction may be moved via a controllable antenna array to stay. or mostly stay, within one country, which is sometimes referred to as a "steerable beam". For example, beam coverage may move slowly within one country and then hop to a new country, e.g., after an SV 102, 202, 302 has transferred to a new earth station 104 or new gNB 106 or 307.

Figure 5:
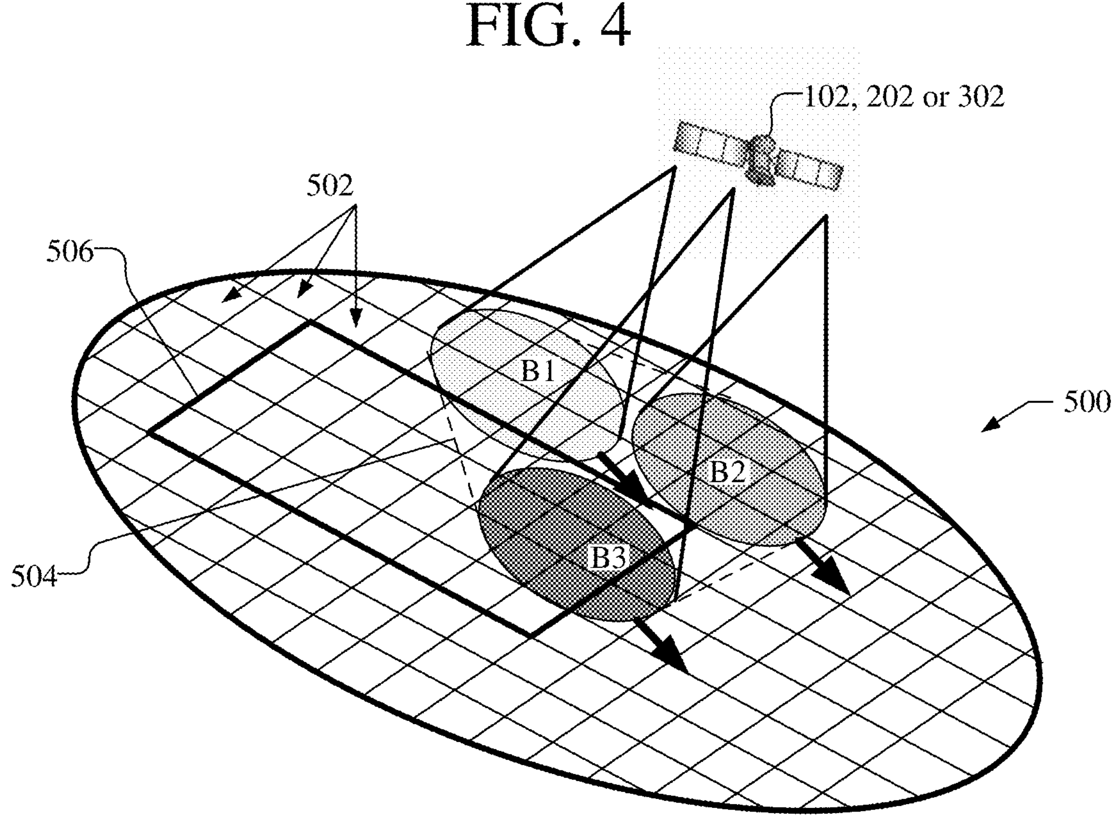
FIG. 5 illustrates radio cells produced by an SV over an area that includes a number of fixed cells.

FIG. 5 illustrates radio cells produced by an SV 102, 202, 302 over an area 500, where fixed cells 502 and fixed tracking areas 506 are used. A radio cell may comprise a single beam or multiple beams, e.g., all beams in a radio cell may use the same frequency or a radio cell may comprise one beam for each frequency in a set of different frequencies. For example, beams B1, B2 and B3 may support three separate radio cells (one beam per radio cell) or may collectively support a single radio cell (e.g., radio cell 504 shown with dotted lines). Preferably, a radio cell covers a contiguous area.

Radio beams and radio cells produced by an SV 102, 202, 302 may not align with cells used by terrestrial wireless networks, e.g., 5GCN 110 terrestrial cells or LTE terrestrial cells. For example, in an urban area, a radio beam or radio cell produced by an SV 102, 202. 302 may overlap with many 5GCN terrestrial cells. When supporting satellite access to a wireless network, radio beams and radio cells produced by an SV 102, 202, 302 may be hidden from a 5GCN 110.

As illustrated in FIG. 5, the area 500 includes a number of Earth fixed cells 502, as well as fixed tracking areas (TAs) such as TA 506. Fixed cells are not "real cells," e.g., used for terrestrial NR and LTE access, and may be referred to as "virtual cells", "mapped cells", or "geographic cells." A fixed cell, such as fixed cells 502, has a fixed geographic coverage area, which may be defined by a PLMN operator. For example, the coverage area of a fixed cell or a fixed TA may comprise the interior of a circle, ellipse, or a polygon. The coverage area is fixed relative to the surface of the Earth and does not change with time, unlike the coverage area of a radio cell which typically changes with time for a low Earth orbit (LEO) or medium Earth orbit (MEO) SV. A fixed cell 502 may be treated by a CN (e.g. a 5GCN 110) the same as a real cell that supports terrestrial access (e.g. using NR or LTE). Groups of fixed cells 502 may define a fixed TA 506, which may be treated by a CN (e.g. a 5GCN 110) the same as a TA that is defined for terrestrial access (e.g. using NR or LTE). Fixed cells and fixed TAs used for satellite wireless access may be used by a CN (e.g. a 5GCN 110) to support mobility management and regulatory services for UEs 105 with minimal new impact.

With regenerative SVs 202 with a non-split architecture as in network architectures 200, each radio cell may remain with the same SV 202 and may have a moving coverage area supporting different 5GCNs 110 at different times.

With transparent SVs 102 and regenerative SVs 302 for a split architecture as in network architectures 100 and 300, each radio cell may be assigned to and controlled by one gNB 106 or 307 on behalf of one or more PLMNs in one country. For a geostationary Earth orbit (GEO) SV 102/302, the assignment to a gNB 106/307 may be permanent or temporary. For example, the assignment may change on a daily basis to allow for peak traffic occurrence at different times in different parts of the SV 102/302 radio footprint and/or may change over a longer period to accommodate changing regional traffic demands. For a non-geostationary (NGEO) SV 102/302, the assignment might last for a short time, e.g., only 5-15 minutes. A non-permanent radio cell may then be transferred to a new gNB 106/307 as necessary (e.g. when access to the NGEO SV 102/302 is transferred to the new gNB 106/307). Each gNB 106/307, for example, may have a fixed geographic coverage area, e.g., comprising a plurality of fixed cells 502 and fixed TAs. A radio cell for a first NGEO SV 102/302 may be transferred from a first gNB 106/307 to a second gNB 106/307 when (or after) moving into the fixed coverage area of the second gNB 106/307. Prior to this transfer, UEs 105 accessing the radio cell in a connected state may be moved to a new radio cell for the first gNB 106/307 or could be handed off to the second gNB 106/307 as part of transferring the radio cell. An SV 102/302 may be accessed from only one gNB 106/307 or from multiple gNBs 106/307, possibly in different countries. In one implementation, an SV 102/302 may be assigned to multiple gNBs 106/307 by partitioning radio cells produced by the SV 102/302 among the different gNBs 106/307. Radio cells may then be transferred to new gNBs 106/307 (and to new countries) as the SV 102/302 moves or as traffic demands change. Such an implementation could be a form of a soft handoff in which SV 102/302 transfer from one gNB 106/307 to another gNB 106/307 occurs in increments of radio cells and not all at once.

Figure 6:
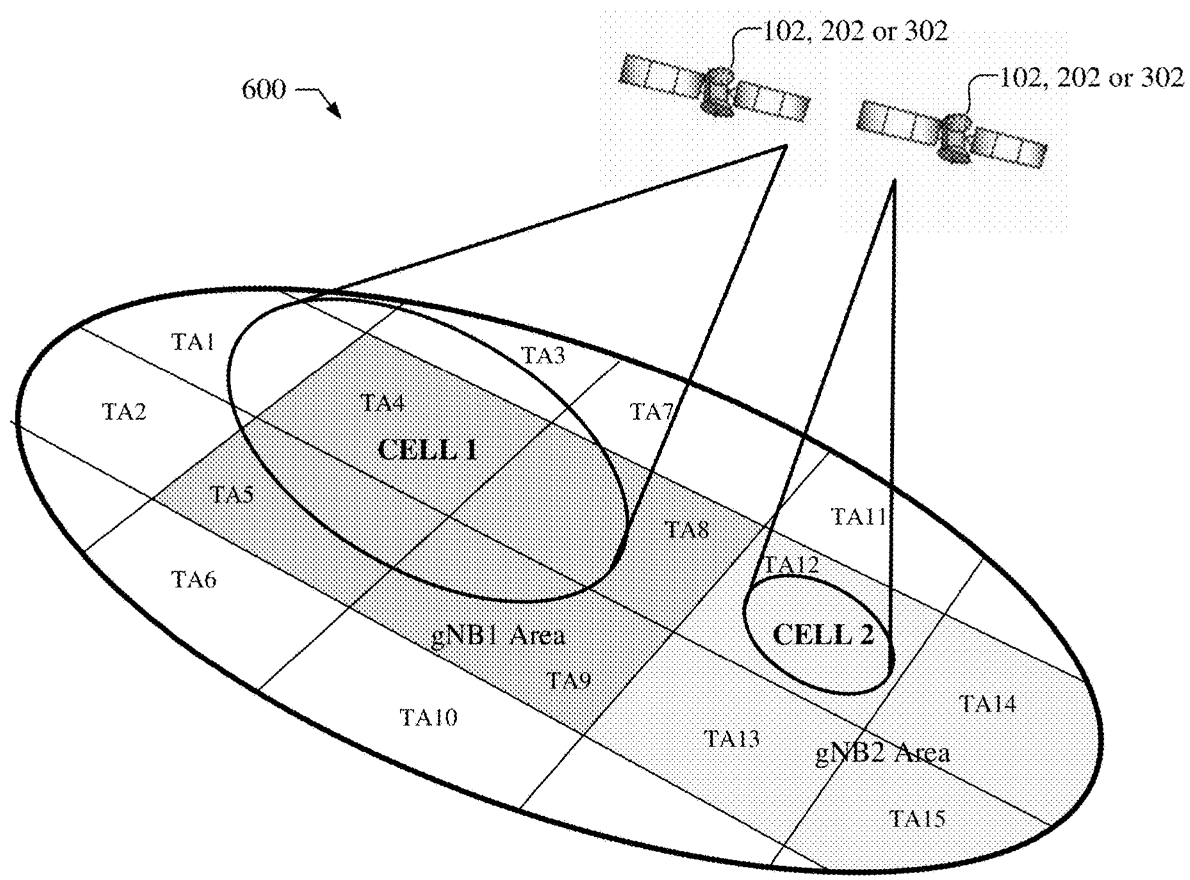
FIG. 6 illustrates an assignment of radio cells produced by an SV to fixed tracking areas (TAs).

FIG. 6 shows an example of assignment of radio cells, e.g., cell 1 and cell 2, produced by one or more SVs 102, 202, 302 over an area 600. As illustrated, the area 600 includes a number of fixed TAs, e.g., TA1-TA15, where TA4, TA5, TA8, and TA9 are assigned to a gNB1 (not shown and which may be a gNB 106, gNB 202 or a gNB 307), and TA12, TA13, TA14, and TA15 are assigned to a gNB2 (not shown and which may be another gNB 106, 202 or 307). In one implementation, a radio cell may be considered to support a fixed TA if the radio cell is wholly within the TA (e.g., Cell 2 within TA 12); if the TA is wholly within the radio cell (e.g., TA4 within Cell 1); or if the overlap of the area of a radio cell and a TA exceeds a predetermined threshold fraction of the total area of the radio cell or the total area of the TA (e.g., cell 1 overlap with TA1, TA3, TA5, TA8 or TA9). An SV 102, 202, 302 may broadcast, e.g., in a System Information Block type 1 (SIB1) or SIB type 2 (SIB2), the identities (IDs) of supported PLMNs (e.g., where a PLMN ID comprises a Mobile Country Code (MCC) and Mobile Network Code (MNC)) and, for each supported PLMN, the IDs of supported TAs (e.g. where the ID of a TA comprises a Tracking Area Code (TAC) or a Tracking Area Identity (TAI)). For an NGEO SV, the supported PLMNs and TAs may change as a radio cell coverage area changes. A gNB 106/202/307 may determine PLMN and TA support (and thus the PLMN IDs and TACs which are broadcast in a SIB for each radio cell) from known ephemeris data for each SV 102/202/302 and a known directionality and angular range for component radio beams for each radio cell (e.g. Cell 1 and Cell 2). A gNB 106/202/307 may then update SIB broadcasting.

Thus, as illustrated in FIG. 6, an SV 102/202/302 may broadcast for cell 1 a SIB that includes TAIs or TACs for TA4 and possibly TA1, TA3, TA5, TA8 and/or TA9. Similarly, the SV 102/202/302 or another SV 102/202/302 may broadcast for Cell 2 a SIB that includes a TAC or TAI for TA12 only. The Cell 1 may be assigned to gNB1 (which has coverage of TA4, TA5, TA8, and TA9) and Cell 2 may be assigned to gNB2 (which has coverage of TA12, TA13, TA14, and TA15). Cell 1 and Cell 2 may be transferred from gNB1 to gNB2 or from gNB2 to gNB1 if the cell coverage area moves from one gNB area to another.

The coverage area for a fixed TA may be defined in a manner that is simple, precise, flexible and requires minimal signaling for conveyance to a UE 105, a gNB 106/202/307, or an entity in a 5GCN 110. A fixed TA area may be small enough to allow efficient paging by comprising an area supported by just a few radio cells (e.g. less than or equal to 5) and may also be large enough to avoid excessive UE registration (e.g. may extend at least 100 kilometers in any direction). The shape of a fixed TA area may be arbitrary, e.g., the shape may be defined by a PLMN operator, or may have one or more restrictions. For example, one restriction for the shape of the fixed TA area may be that a fixed TA along the border of a country precisely aligns with the border to avoid serving UEs 105 in another country. Additionally, a fixed TA may be restricted to align with an area of interest, e.g., a PSAP serving area, the area of a city, county, state or small country, etc. Additionally, a fixed TA may be restricted so that parts of the fixed TA align with a physical obstacle, such as the bank of a river or lake.

The coverage area for fixed cells may likewise be defined in a manner that is simple, precise, flexible and requires minimal signaling for conveyance to a UE 105 or gNB 106/202/307. A fixed cell coverage area may allow for simple and precise association with a fixed TA, e.g., one fixed cell may belong unambiguously to one TA.

Fixed cells may be used by a wireless core network, such as a 5GCN 110, for support of regulatory services such as emergency (EM) call routing based on a current fixed serving cell for a UE 105, use of a fixed cell to approximate a UE 105 location, use of a fixed cell association to direct a Wireless Emergency Alerting (WEA) alert over a small defined area to a recipient UE 105, or use of a fixed cell as an approximate location or a trigger event for Lawful Interception (LI) for a UE 105. Such usage of fixed cells implies that fixed cells should be capable of being defined with a size and shape similar to that of cells that are defined and used for terrestrial wireless access, including allowing for very small (e.g., pico) cells and large (e.g., rural) cells.

With satellite wireless access, a UE 105 may determine a TA based on broadcast information, as well as from other sources. Moreover, a network may broadcast more than one TAC or TAI per PLMN in a radio cell. The broadcast of one TAC or one TAI per PLMN in a radio cell (e.g., in a System Information Block type 1 (SIB1)) may be referred to as a "hard TAC update or "hard TAI update" (e.g. since any change in the broadcast TAC or TAI would be total and thus "hard) and may align with support of TAC or TAI broadcast within a terrestrial network (TN). The broadcast of more than one TAC or TAI per PLMN in a radio cell may be referred to as a "soft TAC update" or "soft TAI update" (e.g. since not all broadcast TACs or TAIs need be changed at the same time and instead just one broadcast TAC or TAI or a subset of broadcast TACs or TAIs may be changed at the same time which may be seen as "soft"). Both hard TAC (or hard TAI) update and soft TAC (or soft TAI) update may be supported according to network operator preference.

It is noted that the terms TAC and TAI are sometimes used synonymously herein. In fact, a TAC is typically a single value (e.g. comprising 24 bits) indicating a TA in a known PLMN (e.g. where an MCC and MNC identifying the PLMN are known). A TAI typically comprises a mobile country code (MCC), a mobile network code (MNC) and a TAC and thereby indicates both a PLMN (via the MCC and MNC) and a TA in that PLMN (via the TAC). When TACs are broadcast in a radio cell, one or more PLMNs are also indicated for these TACs via MCC and MNC values that are also broadcast. The broadcast TACs then also indicate TAIs from association with the PLMNs (e.g. where a TAI is obtained by combining a broadcast TAC with the broadcast MCC and MNC for each PLMN indicated for the broadcast TAC). Thus a radio cell can effectively broadcast both TACs and TAIs. Since the TACs always point to TAIs, the term "broadcast TAI" is generally used herein, as it can be more precise.

Figure 7:
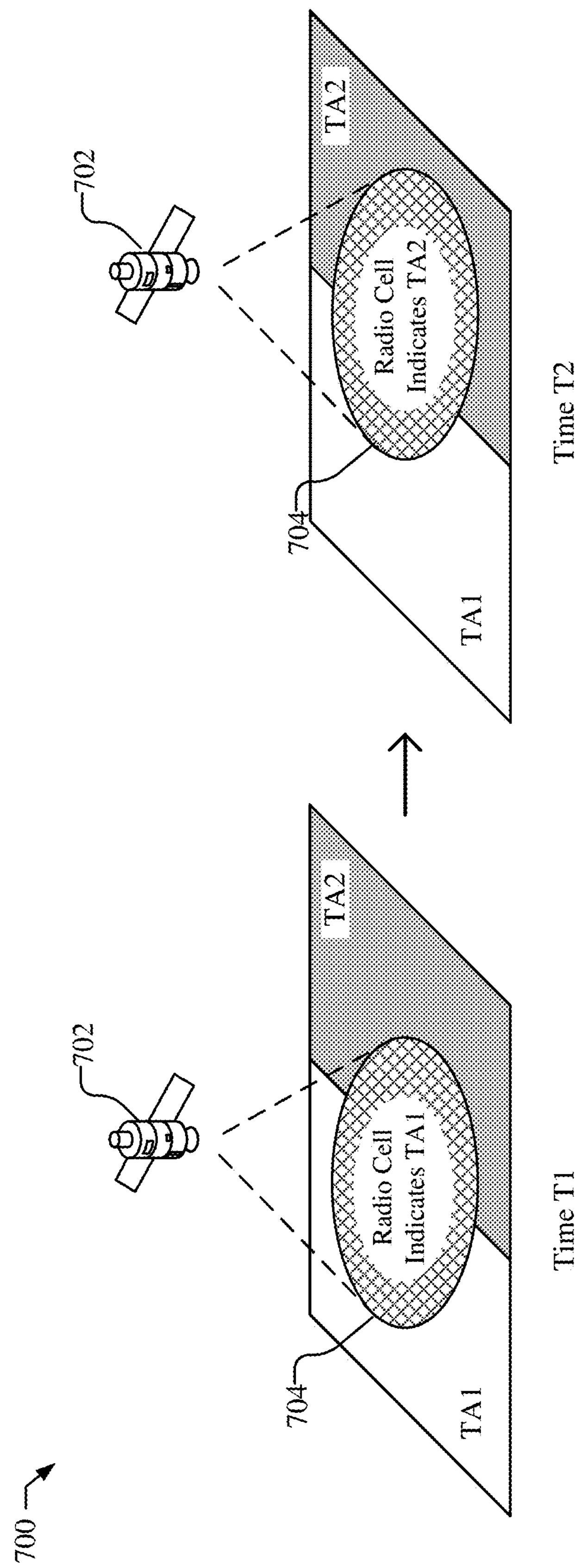
FIG. 7 illustrates an example of a hard TAC update.

FIG. 7 illustrates an example of a hard TAC update 700 by reference to a satellite 702 (e.g. an SV 102, 202 or 302) and a radio cell 704 moving from left to right (e.g., West to East) over two TAs, TA1 and TA2. At time T1, more of the radio cell coverage area is over TA1 than TA2. Accordingly, at time T1, the radio cell 704 indicates TA1 and not TA2 (e.g., using a TAC or TAI indicating TA1 in a SIB1 broadcast in the radio cell 704). At a later time T2, the satellite 702 and the radio cell 704 have moved such that more of the radio cell coverage area is now over TA2 than TA1. Accordingly, at time T2, the radio cell 704 indicates TA2 and not TA1 (e.g., using a TAC or TAI indicating TA2 in a SIB1 broadcast in the radio cell 704).

The sudden switch from broadcasting an indication of TA1 to TA2 in the radio cell 704 will appear as mobility to UEs that are accessing the radio cell 704 (even for UEs that are stationary). Accordingly, a UE in tracking area TA1 and whose registration area does not include TA2 may be triggered to Register due to the hard TAC update that occurs sometime after time T1 and by or before time T2, even if the UE is stationary.

Figure 8:
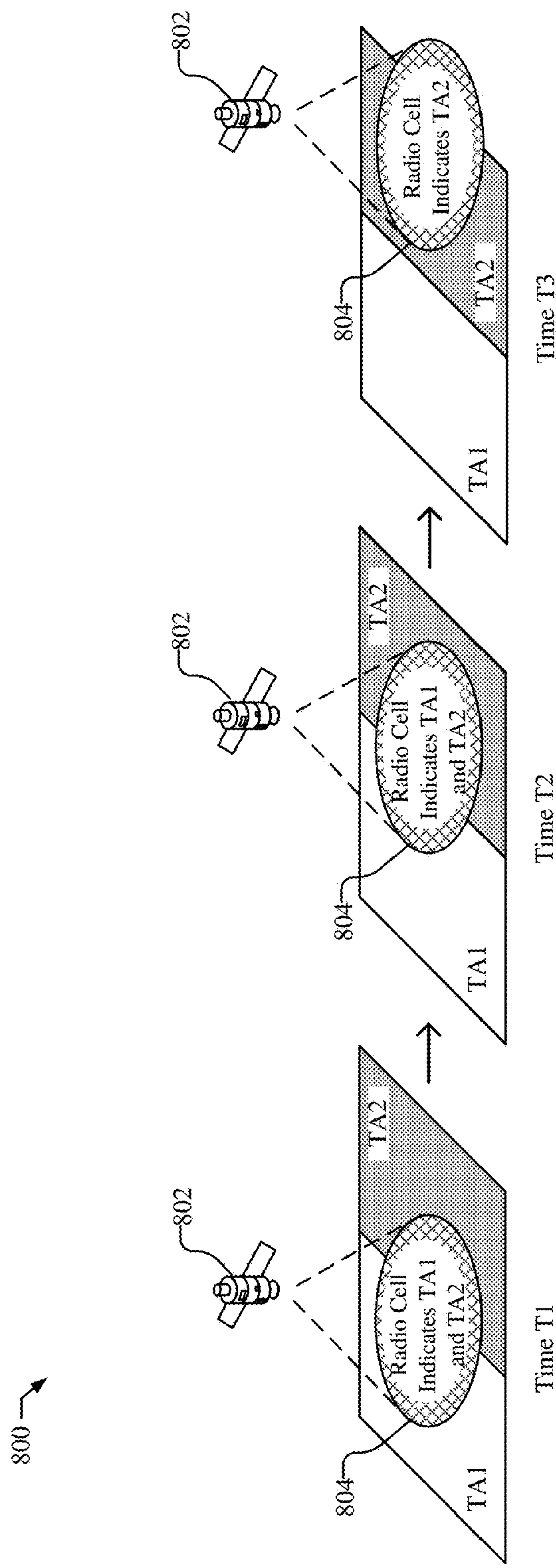
FIG. 8 illustrates an example of a soft TAC update.

FIG. 8 illustrates an example of a soft TAC update 800. Similar to the example shown in FIG. 7, FIG. 8 illustrates the soft TAC update 800 by reference to a satellite 802 (e.g. an SV 102, 202 or 302) and a radio cell 804 moving from left to right (e.g., West to East) over two TAs, TA1 and TA2. As illustrated, at both time T1 and time T2, the radio cell 804 indicates both TA1 and TA2 (e.g., using a TAC or TAI indicating TA1 and a second TAC or TAI indicating TA2 in a SIB1 broadcast in the radio cell 804). This can allow access from UEs whose registration areas include at least one of TA1 and TA2 and can avoid a Registration update at or before time T2. At a later time T3, when the radio cell 804 coverage area has moved completely out of TA1, the radio cell 804 will no longer indicate TA1, but will indicate TA2, and may also indicate one or more other TAs with radio cell coverage (not shown in FIG. 8) to the right of TA2. Thus, with a soft TAC update, the radio cell 804 may indicate coverage of more than one TA, e.g., all TAs with some overlap with the radio cell coverage area. The radio cell 804 may cease indicating a particular TA once the radio cell coverage area no longer overlaps with that TA.

For both hard TAC update (shown in FIG. 7) and soft TAC update (shown in FIG. 8), an AMF 122 may continue to page a UE 105 using the TAs in the UE Registration Area (RA). The RA, for example, includes (or indicates) one or more TAs that the UE is allowed to access without performing Registration with the core network. An NG-RAN 112 may determine which radio cells currently indicate one TA (for hard TAC update) or at least one TA (for soft TAC update) in the RA for a UE 105 and can send paging messages for the UE 105 only in those radio cells. It should be noted that this does not preclude more precise paging based on a last known Cell Global Identity (CGI) for a last used fixed cell for a UE 105, but may be needed when the more precise paging fails to reach the UE 105 (e.g. if the UE 105 moves away from the last used fixed cell). If a UE 105 always performs a Registration update when accessing a radio cell which indicates a TA outside the RA (for hard TAC update) or which indicates TAs that are all outside the RA (for soft TAC update), the 5GC (AMF 122) can update the UE's RA to include the new TA(s) and thereby allow access by the UE 105 to the radio cell. Paging of the UE 105 can then continue to function correctly. As an example, a UE 105, whose RA includes TA1 but not TA2, which accesses the radio cell 704 in FIG. 7 at time T2, would need to perform a Registration update to enable the AMF 122 to change the UE's RA to include TA2. Similarly, the same UE 105 accessing the radio cell 804 in FIG. 8 would not need to perform a Registration at time T2 as the radio cell 804 continues to indicate TA1, but would need to perform a Registration at or sometime before time T3 (if the UE 105 can still access the radio cell 804) when the radio cell 804 ceases to indicate TA1. Thus, both hard TAC update and soft TAC update enable reliable Paging if an NG-RAN 112 directs paging messages to radio cells indicating a TA (for hard TAC update) or at least one TA (for soft TAC update) in a UE's RA.

One consequence of soft TAC update is that a UE 105 may move into a new TA that is not part of the RA and may not be aware of this. For example, in FIG. 8, a UE 105 may be inside TA1 at time T1 and move into TA2 at time T2. The UE 105 would not be aware that it had moved into a new tracking area because the radio cell 804 will continue to indicate both TA1 and TA2 at time T1 and time T2. The same may happen for hard TAC update in FIG. 7 if a UE 105 whose RA includes TA1 but not TA2 were to move from TA1 into TA2 at time T1 as the radio cell 704 indicates TA1 at this time.

When a UE 105 initiates a NAS procedure with a 5GCN 110 (e.g., a non-access stratum (NAS) Service Request), the NG-RAN 112 may need to indicate the current TA in which the UE is located to the 5GCN 110 (e.g. an AMF 112) as part of an NGAP User Location Information (ULI) information element (IE). If the NG-RAN 112 indicates the correct TA according to configured geographic definitions of TAs and the current geographic location of the UE 105, there may be problems for both hard TAC update and soft TAC update if the correct TA for the UE 105 indicated in the ULI is not part of the UE 105 RA. This may be seen as an anomaly (a "TA anomaly") by the 5GCN 110 (e.g. AMF 122) because the UE 105 is meant to perform a Registration update with the 5GCN 110 whenever it moves outside of the RA. Thus, for both hard TAC update and soft TAC update, a UE 105 may enter a TA that is not part of the RA and may remain unaware of this and consequently fail to perform a Registration update. This may lead to a "TA anomaly" where the UE initiates a NAS procedure and the ULI delivered to the 5GC by NG-RAN indicates a TA that is not part of the RA.

The TA anomaly may be removed for hard TAC update by changing the TA in the ULI. For example, instead of indicating in the ULI the correct TA in which the UE 105 is geographically located, the NG-RAN 112 may instead indicate an incorrect TA that was indicated to the UE 105 by the radio cell. This incorrect TA will at least match the TA seen by the UE 105 in the radio cell and will be part of the RA. Thus, the TA anomaly will not occur, although the 5GCM 110 (e.g. AMF 122) will receive an indication of an incorrect TA. This incorrect TA indication will have other consequences, since the ULI will also need to include a CGI indicating a fixed cell in which the UE 105 is located, in order to support services like routing of an emergency call to a PSAP, charging and possibly precise paging of a UE 105 in a last known fixed cell. Accordingly, the AMF 122 will receive a CGI and TAI in the ULI where the CGI is for a fixed cell that is not part of the TA indicated by the TAI, which can be considered as a "TAC-CGI mismatch anomaly". In some implementations, this anomaly could trigger an error either in real time or later when the TAI and CGI are processed offline. Thus, even for hard TAC update, it may be preferable to deal with the "TA anomaly" rather than the "TAC-CGI mismatch anomaly". Therefore, both hard and soft TAC update may benefit from a different type of resolution for the TA anomaly.

Various implementations may be used for Registration to resolve the TA anomaly. Each implementation as discussed below, it may be assumed that the UE 105 initiates a NAS request or procedure (e.g. a Service Request or PDU Establishment Request) and the AMF 122 receives a ULI IE from the NG-RAN 112 indicating a new TA for the UE which is not part of the current RA for the UE. The implementations are referred to as I1, I2, I3, I4 and I5.

In an implementation I1, the anomaly may be ignored by the AMF 122. For example, the 5GCN 110 behaves as if the UE 105 is still within the current RA for the UE 105. At some point, the UE 105 would be likely to access a radio cell that does not indicate any TA in the UE 105 RA (as a simple consequence of the UE 105 not being located in the RA) and the UE 105 would then perform a Registration update, allowing the 5GCN 110 to update the UE 105 RA. Also, the UE 105 will still perform periodic Registration to allow similar update of the RA. Implementation I1 has no obvious new impacts to a UE 105 or AMF 122. However, ignoring that a UE 105 is now in a TA which the UE 105 is not aware of and which is outside the UE 105 RA may impact and degrade subsequent paging of the UE 105. For example, the AMF 122 may know that the UE 105 is in some fixed TA and fixed cell but cannot necessarily page the UE 105 based on these because the UE 105 will avoid accessing a radio cell which indicates support for this TA but not for any other TA in the UE 105's RA. Additionally, a 5GCN 110 may be configured to perform certain services and functions when a UE 105 exits an RA, as part of a new registration, which must now be deferred for some indefinite time.

In another implementation I2, an immediate Registration may be performed by the AMF 122. For example, if a TA indicated in the UE 105 ULI IE is an allowed TA for the UE 105, the AMF 122 may request the UE 105 to perform a Registration by (temporarily) rejecting the NAS procedure request from the UE 105 with a new cause value indicating Registration. Once the Registration has been performed by the UE 105, the UE 105 can re-initiate the original NAS procedure. Immediate Registration may have a small NAS signaling impact to define a new cause value for the NAS reject message sent for the originally requested NAS procedure. There also may be small impacts to the AMF 122 and UE 105 to support the return of such a new cause value and for the UE 105 to instigate the Registration and later re-initiate the originally requested NAS procedure. The temporary rejection of the originally requested NAS procedure and its re-initiation will also add some small extra delay for the originally requested NAS procedure.

In another implementation I3, a deferred Registration may be performed by the AMF 122. For example, the AMF 122 may perform the originally requested NAS procedure if the TA indicated in the UE 105 ULI is an allowed TA for the UE 105. The AMF 122 may also send a NAS Configuration Update Command to the UE 105 to request the UE 105 to perform a Registration. The NAS Configuration Update Command may be sent either as soon as the AMF 122 discovers the UE 105 is in a TA that is not part of the current RA or after the originally requested NAS procedure is complete. Deferred Registration may avoid new NAS signaling impacts and impacts to the UE 105 but may have a small impact to the AMF 122 to send the NAS Configuration Update message. In addition, performing the original NAS procedure in the AMF 122 before the Registration has occurred may carry a small risk of some error since the UE 105 is located in a TA that is outside the RA.

In a further implementation I4, implicit Registration may be performed by the AMF 122. For example, the AMF 122 may treat the NAS procedure request from the UE 105 as an implicit Registration in the TA indicated in the UE 105 ULI IE. The AMF 122 may also perform other functions associated with a Registration (e.g., update charging information). The AMF 122 then returns the results of the implicit Registration (e.g., provides new Tracking Area Identities (TAIs) in a new RA) to the UE 105 using a NAS Configuration Update Command. Implicit Registration may have no new NAS signaling impact and no new UE impact. However, performing an implicit Registration in an AMF 122 in the absence of a Registration Request from the UE 105 may have some impact as there may be many potential functions that can be performed by an AMF 122 associated with Registration.

In another implementation I5, geographic information may be configured for allowed TAs in a UE 105. For example, the AMF 122 may include a geographic definition of each TA that is part of an RA that is sent to a UE 105 in a NAS Registration Accept. A geographic definition of a TA may, for example, indicate a boundary of the TA (e.g. as a circle, ellipse or polygon). The geographic definitions can be configured by O&M in AMFs and can be treated as non-interpreted blocks of data with low impact to an AMF 122. A UE 105 may then determine its location using GNSS (or some other position method) and determine its current TA based on the location and the geographic definitions of the TAs. The UE 105 can then perform a Registration when no longer in any TA that is part of the current RA. This implementation may have significant extra UE impact and at least some extra AMF impact. It may also impact O&M (to configure standardized TAs in an AMF) and may restrict the flexibility of TA configuration since the geographic definition of a TA would have to conform to a standard.

It is noted that the TA anomaly described above, and its resolution using one of implementations I1, I2, I3, I4, or I5, may occur with either hard TAI update or soft TAI update when the ULI IE provided by a RAN node (e.g. gNB) to a core network node (e.g. AMF) includes a TAI indicating a TA in which the UE is geographically located, and where the TAI is not part of a current RA for the UE. In some implementations, the ULI IE may include additional TAIs, such as TAIs belonging to a serving PLMN for the UE that are broadcast in a serving radio cell for the UE (e.g. in a SIB1). The presence of the additional TAIs may be helpful to the core network node in determining whether the UE is allowed to access the serving radio cell. For example, the core network node may determine that the UE is allowed to access the serving radio cell when at least one of the additional TAIs is part of the current UE RA. Nevertheless, a PLMN operator may still prefer that the core network node instigate a registration of the UE according to one of implementations I2, I3 or I4 in order to, for example, include the TAI for the TA in which the UE is located in a new RA for the UE. In such cases, one of implementations I2, I3 or I4 may still be useful for the core network node and UE.

Figure 9:
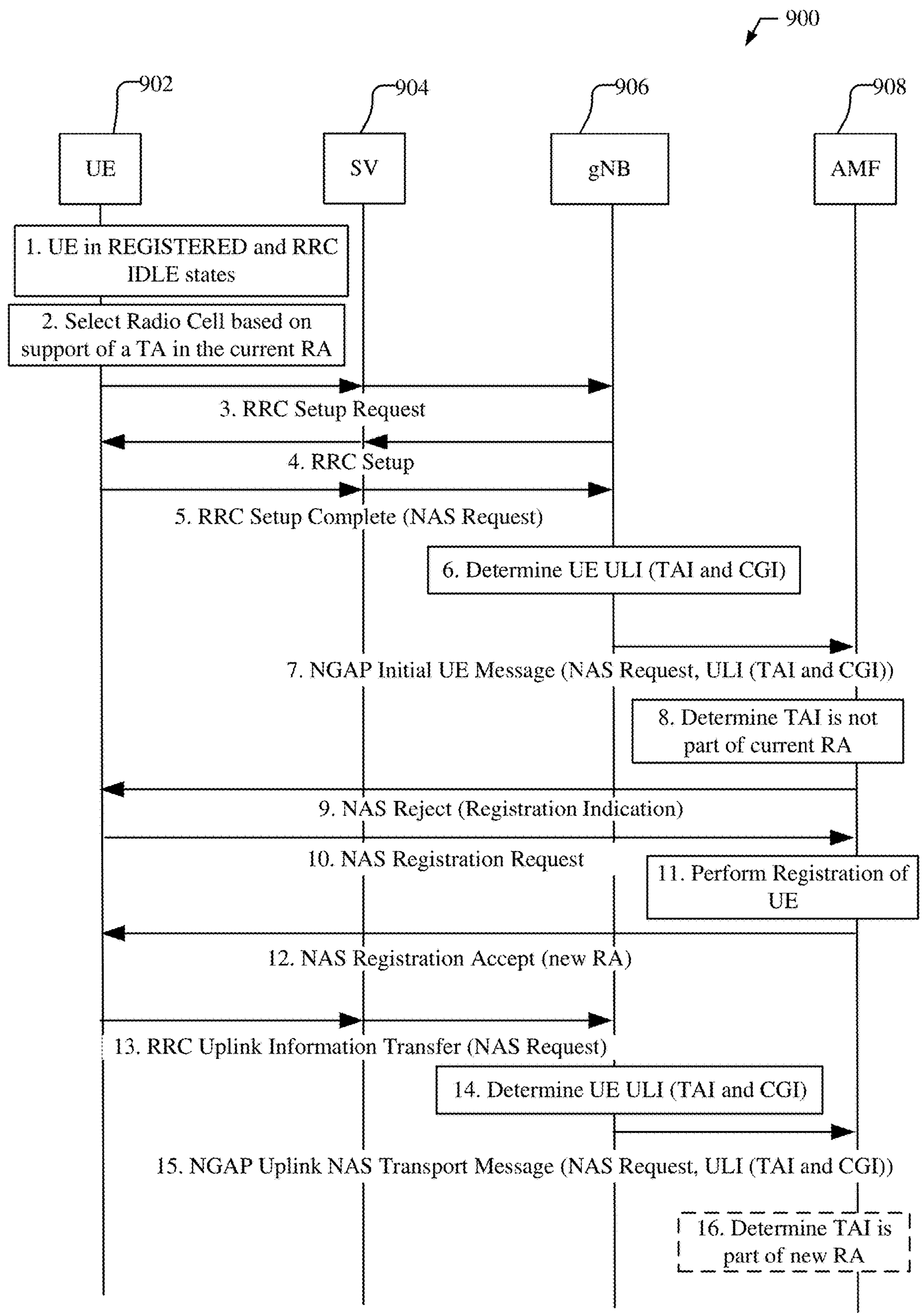
FIG. 9 shows a signaling flow that illustrates various messages sent between components of a communication network in a procedure for immediate Registration.

FIG. 9 shows a signaling flow 900 that illustrates various messages sent between components of a communication network in an example procedure for implementation 12 in which an immediate Registration is performed by an AMF. The signaling flow 900 may be performed by entities in the network architectures 100, 200 or 300 for FIG. 1, 2 or 3, respectively, in which the UE 902 corresponds to UE 105, SV 904 corresponds to SV 102, 202 or 302, gNB 906 corresponds to gNB 106/202/307, and AMF 908 corresponds to AMF 122. It should be understood that the gNB 906 or an element of the gNB 906 may be included within the SV 904. For example, with an SV 202, an gNB 202 would be completely included within the SV 202 as described for FIG. 2. Alternatively, with an SV 302, an gNB 307 (also referred to as an gNB-CU) would be terrestrial and physically separate from the SV 302, but the SV 302 would include an gNB-DU 302 as described for FIG. 3.

At stage 1 of FIG. 9, the UE 902 may start off in EMM-REGISTERED and RRC IDLE states.

At stage 2, the UE 902 selects a radio cell (and an associated SV 904) based on support of a TA in the current RA for UE 902 (e.g. where the radio cell broadcasts a TAI that is part of the current RA).

At stage 3, the UE 902 performs a random access procedure to obtain permission from gNB 906 for uplink (UL) transmission (not shown in FIG. 9) then sends an RRC Setup Request to a gNB or gNB-CU 906 supporting the radio cell selected at stage 2 to request an RRC signaling connection.

At stage 4, the gNB or gNB-CU 906 returns an RRC Setup message.

At stage 5, the UE 902 sends an RRC Setup Complete message including a NAS Request. The NAS Request may be a request for a NAS procedure or may be to provide information to the AMF 908. The NAS Request, for example, is not a NAS Registration Request but may be some other UL NAS message such as a Service Request, a PDU Session Establishment Request, or an UL NAS Transport. The NAS Request may require a NAS Response or in some implementations a NAS Response may not be necessary.

At stage 6, the gNB 906 determines the UE 902 User Location Information (ULI) IE including a TAI and CGI. For example, the gNB 906 may determine a location or an approximate location of UE 902 based on a coverage area of the radio cell selected at stage 2, location measurements or a location estimate provided by UE 902 (e.g. included in the RRC Setup Complete message at stage 5) and/or location measurements obtained by gNB 906 of signals received from UE 902 (e.g. as received at stage 3 or stage 5). The gNB 906 may map the location to a fixed cell and a fixed TA based on configuration information for fixed TAs and fixed cells in gNB 906.

At stage 7, the gNB or gNB-CU 906 forwards the NAS Request to an AMF 908 in a serving PLMN for UE 902 in an NGAP transport message, such as an NGAP Initial UE message. The NGAP transport message includes the NAS Request as well as the ULI determined at stage 6, which includes the TAI and CGI.

At stage 8, the AMF 908 determines whether the TAI received for the UE 902 in the NGAP ULI IE is part of the current registration area (RA) for the UE 902. If the TAI for the UE 902 is part of the RA for the UE 902, the AMF 908 may perform the NAS request. On the other hand, if the TAI for the UE 902 is not part of the RA for the UE 902, the remaining stages may be performed.

It should be understood that the signaling flow has been described based on the UE 902 being in an idle state in stage 1. In some implementations, however, the UE 902 may start in a connected state and, e.g., may physically move to a new TA and may not be aware of it. In this implementation, stages 2, 3, and 4 are not used. Moreover, the UE 902 may send a NAS request at stage 5 using an RRC uplink information transfer to the gNB 906 and the gNB 906 may send the message at stage 7 as an NGAP Uplink NAS Transport message.

At stage 9, the AMF 908 sends to the UE 902 a NAS reject message with an indication to request Registration. The NAS reject message, for example, may include a cause value indicating a request for a Registration. The NAS reject message may be a counterpart to the NAS Request and may reject a NAS procedure associated with the NAS Request. For example, the NAS reject may be a Service Reject or a PDU Session Establishment Reject.

At stage 10, the UE 902 sends a NAS Registration Request to the AMF 908 in response to the Registration indication at stage 9. The NAS Registration Request is sent to the AMF 908 via the gNB 906 which can forward the NAS Registration Request to the AMF 908 along with a ULI IE indicating a CGI and TAI for the UE 902 that would typically (unless the UE 902 is moving very rapidly) be the same as the CGI and TAI provided by the gNB 906 to the AMF 908 at stage 7.

At stage 11, the AMF 908 performs Registration of the UE 902 including determining a new RA for the UE 902 that includes an indication (e.g. TAIs) of one or more allowed TAs for the UE 902. For example, the allowed TAs may include the TA for the TAI received by the AMF 908 at stage 7 and/or received as part of stage 10, in which case the AMF 908 may include the TAI received by the AMF 908 at stage 7 and/or at stage 10 in the new RA.

At stage 12, the AMF 908 sends a NAS Registration Accept message to the UE 902 that includes the results of the Registration from stage 11, including the new RA.

At stage 13, the UE 902 may re-initiate the NAS Request by sending an RRC Uplink Information Transfer message to the gNB 906 that includes the NAS Request that was rejected in stage 9.

At stage 14, the gNB 906 determines the UE 902 ULI including the TAI and CGI.

At stage 15, the gNB 906 forwards the NAS Request to the AMF 908 in an NGAP transport message, such as an NGAP Uplink NAS Transport Message. The NGAP transport message includes the NAS request as well as the ULI determined at stage 14, which includes the TAI and CGI.

At stage 16, the AMF 908 may determine whether the TAI for the UE 902 provided at stage 15 is for a TA that is part of the new registration area (RA) for the UE 902. If the allowed TAs at stage 11 include the TA for the TAI received at stage 7 and/or stage 10, the AMF 908 may typically determine that the TAI for the UE 902 provided at stage 15 is for a TA that is part of the new registration area (RA) for the UE 902.

Figure 10:
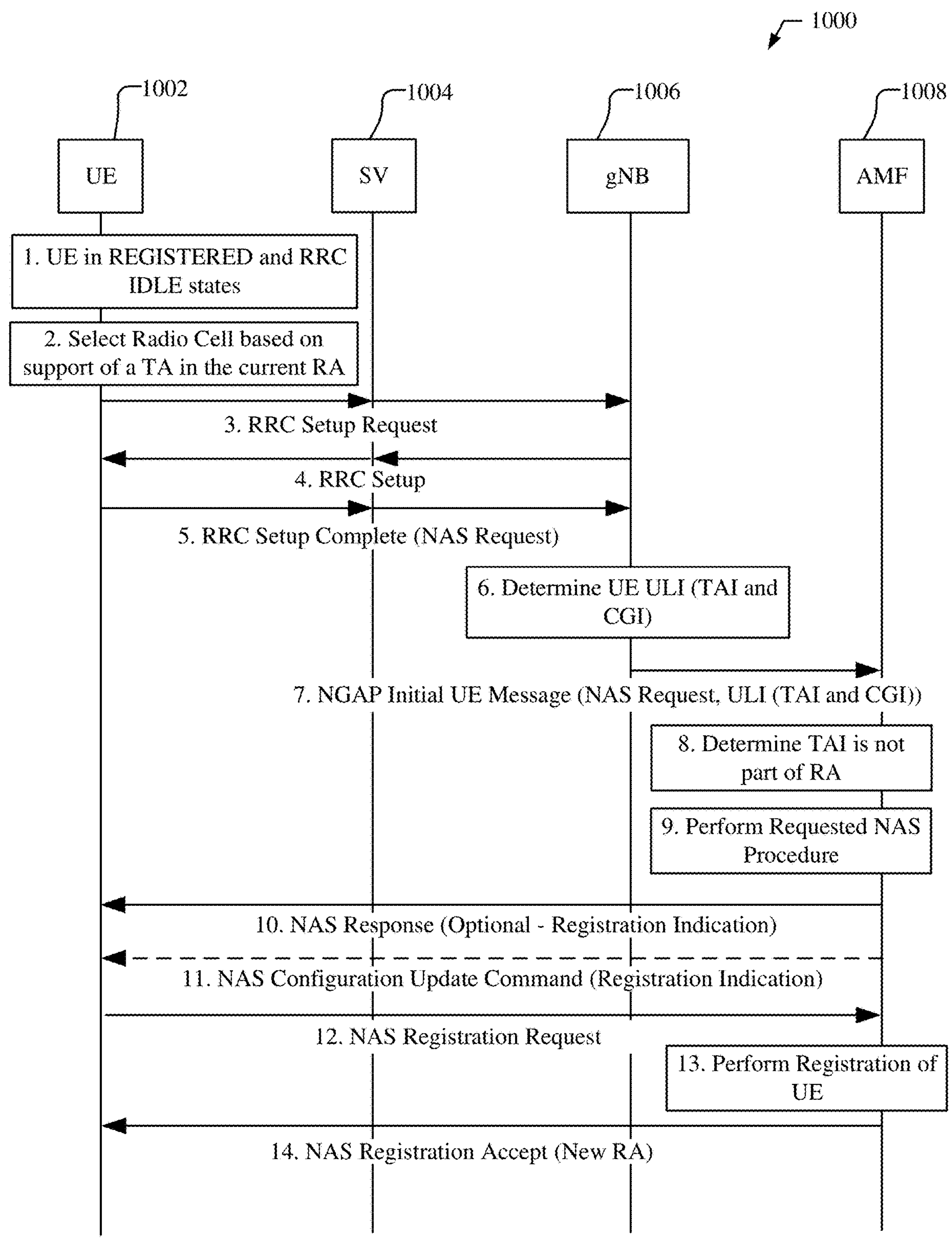
FIG. 10 shows a signaling flow that illustrates various messages sent between components of a communication network in a procedure for deferred Registration.

FIG. 10 shows a signaling flow 1000 that illustrates various messages sent between components of a communication network in an example procedure for implementation 13 in which a deferred Registration is performed by an AMF. The signaling flow 1000 is similar to FIG. 9, discussed above, and may be performed by entities in the network architectures 100, 200 or 300 for FIG. 1, 2 or 3, respectively, in which the UE 1002 corresponds to UE 105, SV 1004 corresponds to SV 102, 202 or 302, gNB 1006 corresponds to gNB 106/202/307, and AMF 1008 corresponds to AMF 122. It should be understood that the gNB 1006 or an element of the gNB 1006 may be included within the SV 1004. For example, with an SV 202, an gNB 202 would be completely included within the SV 202 as described for FIG. 2. Alternatively, with an SV 302, an gNB 307 (also referred to as an gNB-CU) would be terrestrial and physically separate from the SV 302, but the SV 302 would include an gNB-DU 302 as described for FIG. 3.

Stages 1-8 of FIG. 10 are similar to or the same as stages 1-8 of FIG. 9 discussed above.

At stage 9 of FIG. 10, the AMF 1008 may perform a NAS procedure associated with the NAS Request received at stage 7.

At stage 10, the AMF 1008 sends to the UE 1002 a NAS Response message confirming that the NAS procedure was performed in stage 9. Optionally, the NAS Response message may include an indication to request Registration.

At stage 11, which is optional, the AMF 1008 may send a NAS Configuration Update Command message to the UE 1002 that includes an indication to request Registration. The NAS Configuration Update Command at stage 11, for example, may be sent if the NAS Response message at stage 10 does not include the indication to request Registration. The NAS Configuration Update Command at stage 11 may be sent before or after the NAS Response message sent at stage 10.

At stage 12 the UE 1002 sends a NAS Registration Request to the AMF 1008 in response to the Registration indication at stage 10 or 11. The NAS Registration Request is sent to the AMF 1008 via the gNB 1006 which can forward the NAS Registration Request to the AMF 1008 along with a ULI IE indicating a CGI and TAI for the UE 1002 that would typically (unless the UE 1002 is moving very rapidly) be the same as the CGI and TAI provided by the gNB 1006 to the AMF 1008 at stage 7.

At stage 13, the AMF 1008 performs Registration of the UE 1002 including determining a new RA for the UE 1002 that includes an indication (e.g. TAIs) of one or more allowed TAs for the UE 1002. For example, the allowed TAs may include the TA for the TAI received by the AMF 1008 at stage 7 and/or received as part of stage 12, in which case the AMF 1008 may include the TAI received by the AMF 1008 at stage 7 and/or at stage 12 in the new RA.

At stage 14, the AMF 1008 sends a NAS Registration Accept message to the UE 1002 that includes the results of the Registration from stage 13, including the new RA.

Figure 11:
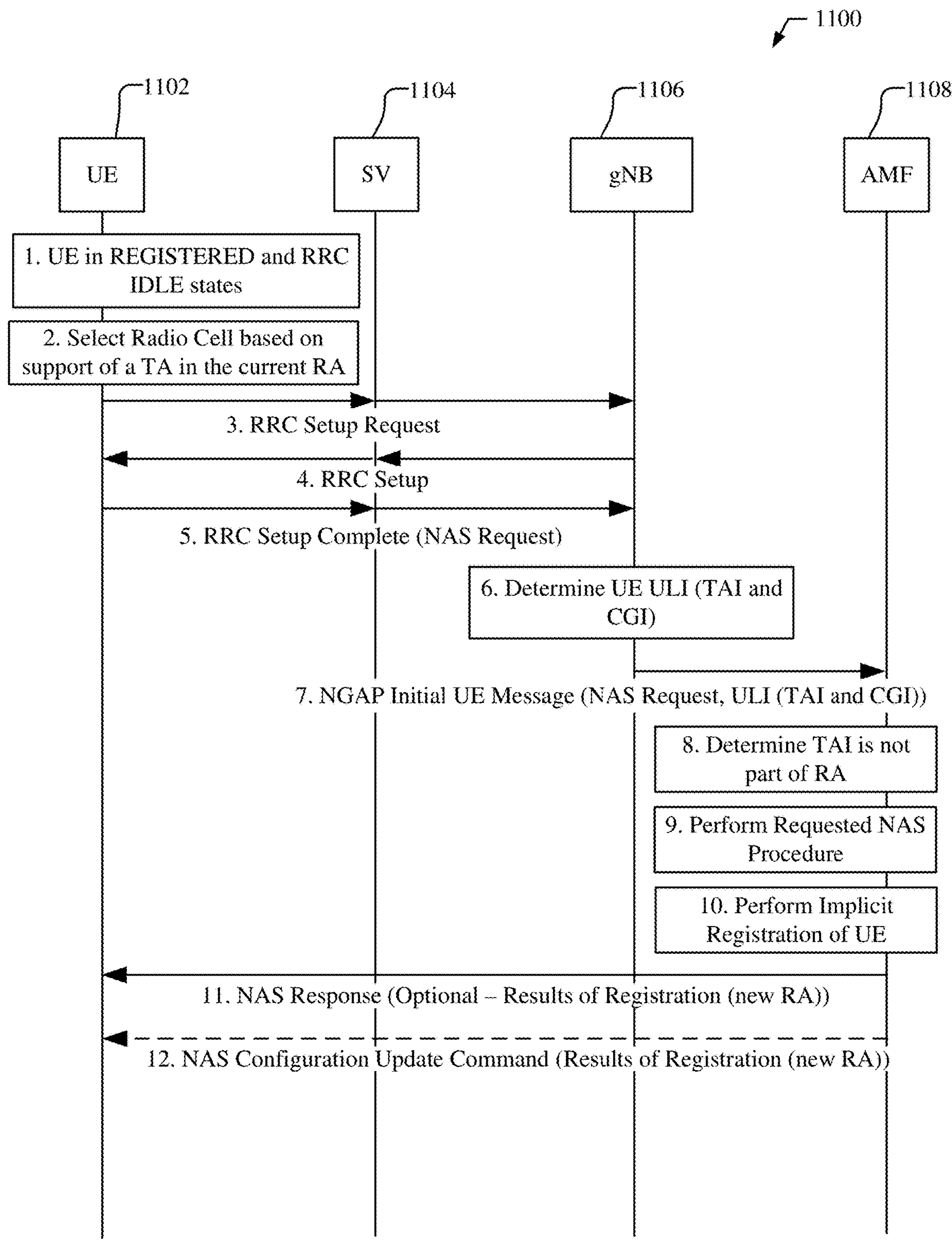
FIG. 11 shows a signaling flow that illustrates various messages sent between components of a communication network in a procedure for implicit Registration.

FIG. 11 shows a signaling flow 1100 that illustrates various messages sent between components of a communication network in an example procedure for implementation 14 in which an implicit Registration is performed by an AMF. The signaling flow 1100 is similar to FIGS. 9 and 10, discussed above, and may be performed by entities in the network architectures 100, 200 or 300 for FIG. 1, 2 or 3, respectively, in which the UE 1102 corresponds to UE 105, SV 1104 corresponds to SV 102, 202 or 302, gNB 1106 corresponds to gNB 106/202/307, and AMF 1108 corresponds to AMF 122. It should be understood that the gNB 1106 or an element of the gNB 1106 may be included within the SV 1104. For example, with an SV 202, an gNB 202 would be completely included within the SV 202 as described for FIG. 2. Alternatively, with an SV 302, an gNB 307 (also referred to as an gNB-CU) would be terrestrial and physically separate from the SV 302, but the SV 302 would include an gNB-DU 302 as described for FIG. 3.

Stages 1-8 of FIG. 11 are similar to or the same as stages 1-8 of FIG. 9 discussed above.

At stage 9 of FIG. 11, the AMF 1108 may perform a NAS procedure associated with the NAS Request received at stage 7.

At stage 10, the AMF 1108 performs an implicit Registration of the UE 1102, e.g., based on information included in the NAS Request and the determination at stage 8 that the TAI received at stage 7 is not part of the RA for the UE 1102. The implicit Registration of the UE 1102 is performed without receiving a Registration request from the UE 1102. During the implicit Registration, the AMF 1108 determines a new RA for the UE 1102 that includes an indication of one or more allowed TAs for the UE 1102. For example, the allowed TAs may include the TA for the TAI received at stage 7, in which case the AMF 1108 may include the TAI received by the AMF 1108 at stage 7 in the new RA. In some implementations, the implicit Registration at stage 10 may be performed before performing the NAS procedure at stage 9.

At stage 11, the AMF 1108 sends to the UE 1102 a NAS Response message confirming that the NAS procedure was performed in stage 9. Optionally, the NAS Response message may include the results of the Registration from stage 10, including the new RA.

At stage 12, which is optional, the AMF 1108 may send a NAS Configuration Update Command message to the UE 1102 that includes the results of the Registration from stage 10, including the new RA. The NAS Configuration Update Command at stage 12, for example, may be sent if the NAS Response message sent at stage 11 does not include the results of the Registration from stage 10, including the new RA. The NAS Configuration Update Command at stage 12 may be sent before or after the NAS Response message at stage 11.

It is noted that FIGS. 9-11 provide examples of the use of immediate Registration, deferred Registration and implicit Registration for a UE that starts off in an RRC IDLE state. However, immediate Registration, deferred Registration and implicit Registration may also be used when a UE is already in an RRC CONNECTED state or starts off in an RRC INACTIVE state. For these cases, examples similar to those in FIGS. 9-11 can occur where the NAS Request sent at stages 5 and 7 is sent using other RRC and NGAP transport messages—e.g. using an RRC UL Information Transfer message at step 5 and an NGAP UL NAS Transport message at stage 7.

It is further noted that while FIGS. 9-11 are applicable to a 5G Network (e.g. UE 105, NG-RAN 112 and 5GCN 110), signaling flows similar to these may be used to support tracking area assignment to, and Registration of, a UE with other types of satellite RAT access. For example, for a UE with satellite access using LTE or NB-IoT, signaling flows analogous to those in FIGS. 9-11 may be used to support an immediate Attach, deferred Attach and implicit Attach for a UE. In such signaling flows, a gNB 906/1006/1106 would be replaced by an eNB, an AMF 908/1008/1108 would be replaced by an MME and references to a Registration, Registration Request and Registration Accept would be replaced by references to an Attach, Attach Request and Attach Accept, respectively.

Figure 12:
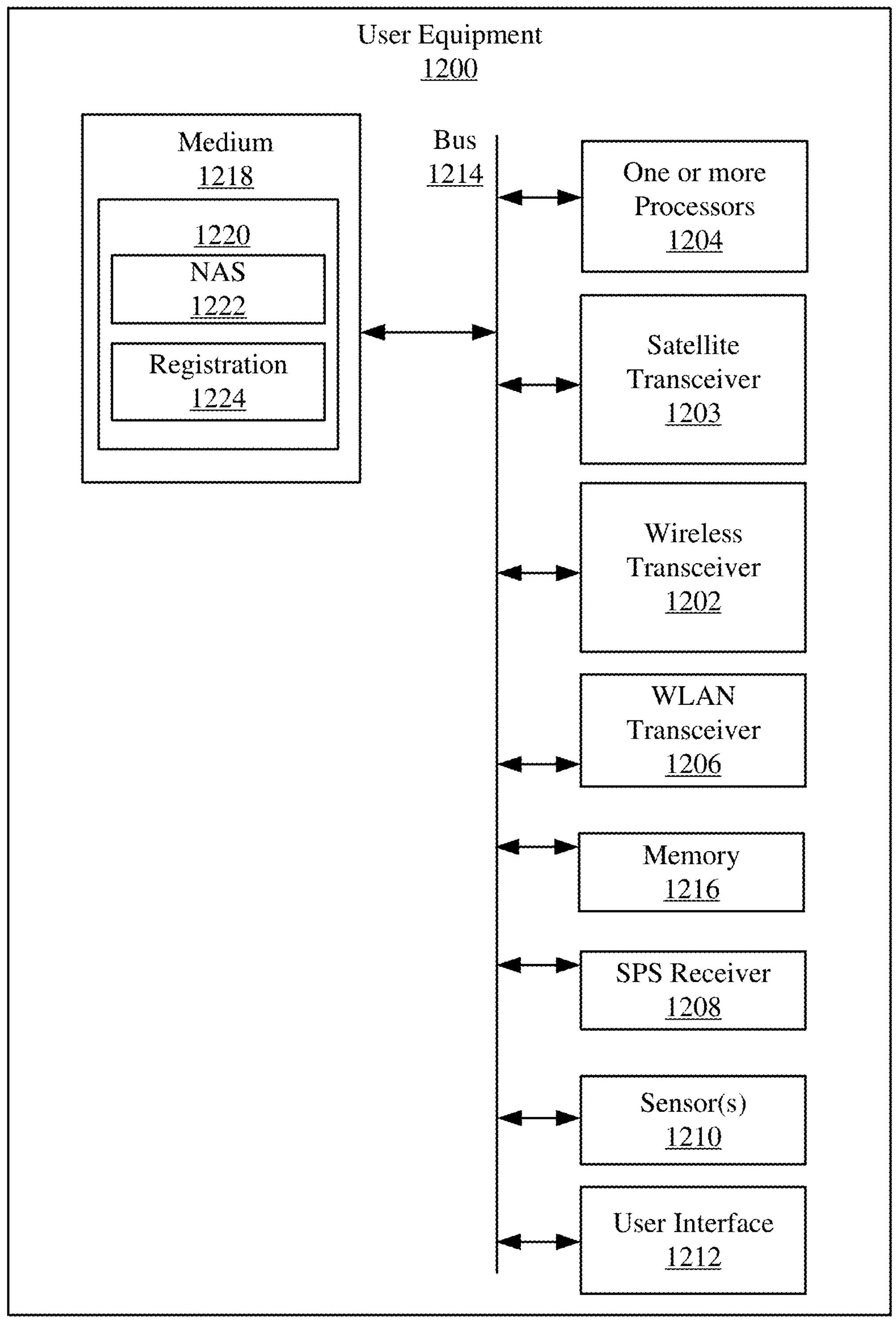
FIG. 12 is a diagram illustrating an example of a hardware implementation of UE configured to perform Registration as discussed herein.

FIG. 12 is a diagram illustrating an example of a hardware implementation of a UE 1200, such as UE 105, UE 902, 1002, 1102 shown in FIGS. 1, 2, 3, 9, 10, and 11. The UE 1200 may be configured to perform the signal flows in FIGS. 9, 10, and 11 and the process flow shown in FIG. 14. The UE 1200 may include, e.g., hardware components such as a satellite transceiver 1203 to wirelessly communicate with an SV 102/202/302 via a wireless antenna (not shown in FIG. 12), e.g., as shown in FIGS. 1, 2, and 3. The UE 1200 may further include wireless transceiver 1202 to wirelessly communicate with terrestrial base stations in an NG-RAN 112 via a wireless antenna (not shown in FIG. 12), e.g., base stations such as a gNB or an ng-eNB. The UE 1200 may also include additional transceivers, such a wireless local area network (WLAN) transceiver 1206, as well as an SPS receiver 1208 for receiving and measuring signals from SPS SVs 190 (shown in FIGS. 1, 2, and 3) via a wireless antenna (not shown in FIG. 12). In some implementations, the UE 1200 may receive data from a satellite, e.g., via satellite transceiver 1203, and may respond to a terrestrial base station, e.g., via wireless transceiver 1202, or via WLAN transceiver 1206. Thus, UE 1200 may include one or more transmitters, one or more receives or both, and these may be integrated, discrete, or a combination of both. The UE 1200 may further include one or more sensors 1210, such as cameras, accelerometers, gyroscopes, electronic compass, magnetometer, barometer, etc. The UE 1200 may further include a user interface 1212 that may include e.g., a display, a keypad or other input device, such as virtual keypad on the display, through which a user may interface with the UE 1200. The UE 1200 further includes one or more processors 1204, memory 1216, and non-transitory computer readable medium 1218, which may be coupled together with bus 1214. The one or more processors 1204 and other components of the UE 1200 may similarly be coupled together with bus 1214, a separate bus, or may be directly connected together or coupled using a combination of the foregoing.

The one or more processors 1204 may be implemented using a combination of hardware, firmware, and software. For example, the one or more processors 1204 may be configured to perform the functions discussed herein by implementing one or more instructions or program code 1220 on a non-transitory computer readable medium, such as medium 1218 and/or memory 1216. In some embodiments, the one or more processors 1204 may represent one or more circuits configurable to perform at least a portion of a data signal computing procedure or process related to the operation of UE 1200.

Figure 14:
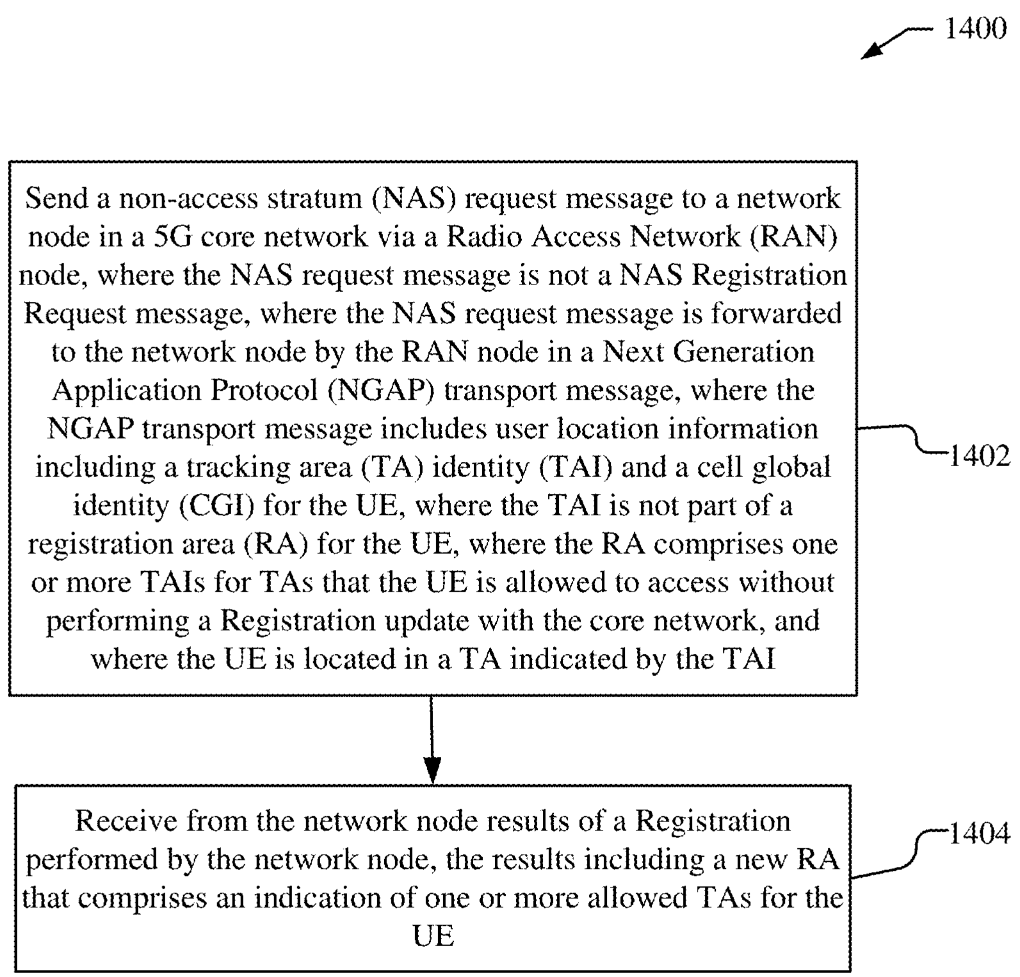
FIG. 14 shows a flowchart of an example procedure for supporting satellite wireless access by a user equipment to a serving public land mobile network (PLMN), performed by the UE.

The medium 1218 and/or memory 1216 may store instructions or program code 1220 that contain executable code or software instructions that when executed by the one or more processors 1204 cause the one or more processors 1204 to operate as a special purpose computer programmed to perform the techniques disclosed herein (e.g. such as the signal flows of FIGS. 9, 10, and 11 and the process flow 1400 of FIG. 14). As illustrated in UE 1200, the medium 1218 and/or memory 1216 may include one or more components or modules that may be implemented by the one or more processors 1204 to perform the methodologies described herein. While the components or modules are illustrated as software in medium 1218 that is executable by the one or more processors 1204, it should be understood that the components or modules may be stored in memory 1216 or may be dedicated hardware either in the one or more processors 1204 or off the processors.

A number of software modules and data tables may reside in the medium 1218 and/or memory 1216 and be utilized by the one or more processors 1204 in order to manage both communications and the functionality described herein. It should be appreciated that the organization of the contents of the medium 1218 and/or memory 1216 as shown in UE 1200 is merely exemplary, and as such the functionality of the modules and/or data structures may be combined, separated, and/or be structured in different ways depending upon the implementation of the UE 1200. While the components or modules are illustrated as software in medium 1218 and/or memory 1216 that is executable by the one or more processors 1204, it should be understood that the components or modules may be firmware or dedicated hardware either in the one or more processors 1204 or off the processors.

The medium 1218 and/or memory 1216 may include a NAS module 1222 that when implemented by the one or more processors 1204 configures the one or more processors 1204 to receive and send messages, via the satellite transceiver 1203 or wireless transceiver 1202, related to a NAS procedures, e.g., as discussed herein. For example, the one or more processors 1204 may be configured to send a NAS request to a network node that is transported by a RAN node in a NGAP transport message, which may include, e.g., user location information including a TAC and a CGI for the UE. In some implementations, the TAC may be for a TA that is not part of a RA for the UE, where the RA comprises one or more TAs that the UE is allowed to access without performing Registration with the core network. The one or more processors 1204 may be configured to send the NAS request, via the satellite transceiver 1203, using a satellite radio cell for the RAN node, wherein the satellite radio cell indicates support for at least one TA in the RA for the UE. The one or more processors 1204 may be configured to receive, via the satellite transceiver 1203 or wireless transceiver 1202, a NAS Request reject message from the network node rejecting a NAS procedure associated with the NAS Request, which may include an indication to request Registration, e.g., as a cause value in the NAS Request reject message. The one or more processors 1204 may be configured to receive, via the satellite transceiver 1203 or wireless transceiver 1202, a NAS response message from the network node confirming that a NAS procedure was performed and which may also include an indication that the UE is to request Registration or the results of the Registration if already performed. For example, the one or more processors 1204 may be configured to receive, via the satellite transceiver 1203 or wireless transceiver 1202, a NAS configuration update command from the network node, which may include the indication to request Registration or the results of the Registration.

The medium 1218 and/or memory 1216 may include a Registration module 1224 that when implemented by the one or more processors 1204 configures the one or more processors 1204 to receive from a network node, via the satellite transceiver 1203 or wireless transceiver 1202, results of a Registration performed by the network node, the results including a new RA that comprises an indication of one or more allowed TAs for the UE. The one or more processors 1204 may be configured to receive from the network node, via the satellite transceiver 1203 or wireless transceiver 1202, an indication to request Registration. The one or more processors 1204 may be configured to send to the network node, via the satellite transceiver 1203 or wireless transceiver 1202, a NAS Registration request message. The one or more processors 1204 may be configured to receive from the network node, via the satellite transceiver 1203 or wireless transceiver 1202, a NAS Registration accept message from the network node, wherein the NAS Registration accept message includes a new RA for the UE.

The methodologies described herein may be implemented by various means depending upon the application. For example, these methodologies may be implemented in hardware, firmware, software, or any combination thereof. For a hardware implementation, the one or more processors 1204 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 1200 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 1218 or memory 1216 and executed by one or more processors 1204, causing the one or more processors 1204 to operate as a special purpose computer programmed to perform the techniques disclosed herein. Memory may be implemented within the one or processors 1204 or external to the one or more processors 1204. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 1200 may be stored as one or more instructions or code on a non-transitory computer-readable storage medium such as medium 1218 or memory 1216. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 1200 may be provided as signals on transmission media included in a communication apparatus. For example, a communication apparatus comprising part or all of UE 1200 may include a transceiver having signals indicative of instructions and data. The instructions and data are stored on non-transitory computer readable medium 1218 or memory 1216, and are configured to cause the one or more processors 1204 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 13:
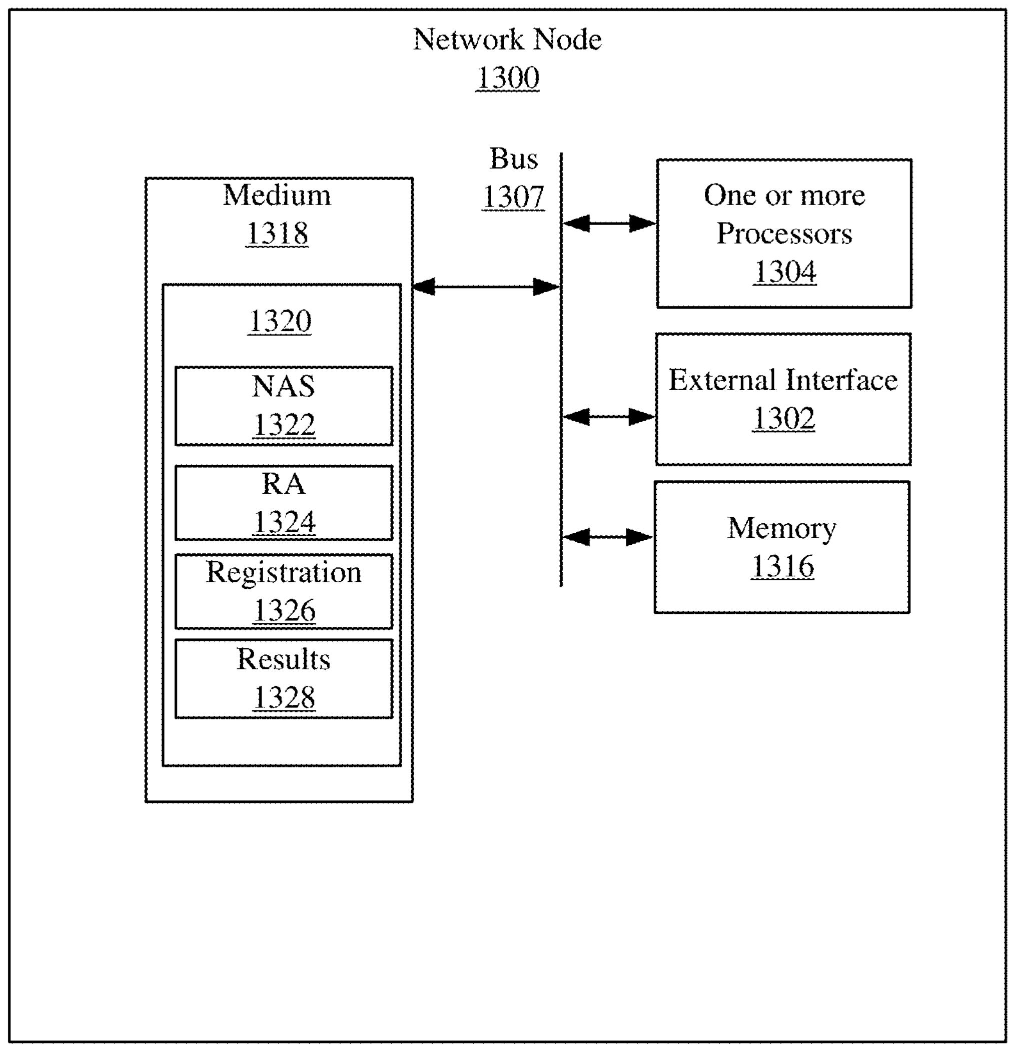
FIG. 13 is a diagram illustrating an example of a hardware implementation of a network node configured to perform Registration as discussed herein.

FIG. 13 is a diagram illustrating an example of a hardware implementation of a network node 1300 in a PLMN. The network node, for example, may be AMF 122, AMF 908, AMF 1008, AMF 1108 shown in FIGS. 1, 2, 3, 9, 10, and 11 or may be an MME. The network node 1300 may perform the signal flows of FIGS. 9, 10, and 11 and the process flow of FIG. 15. The network node 1300 includes, e.g., hardware components such as an external interface 1302 configured to be communication with other network components in the PLMN. The network node 1300 includes one or more processors 1304, memory 1316, and non-transitory computer readable medium 1318, which may be coupled together with bus 1307.

The one or more processors 1304 may be implemented using a combination of hardware, firmware, and software. For example, the one or more processors 1304 may be configured to perform the functions discussed herein by implementing one or more instructions or program code 1320 on a non-transitory computer readable medium, such as medium 1318 and/or memory 1316. In some embodiments, the one or more processors 1304 may represent one or more circuits configurable to perform at least a portion of a data signal computing procedure or process related to the operation of network node 1300.

Figure 15:
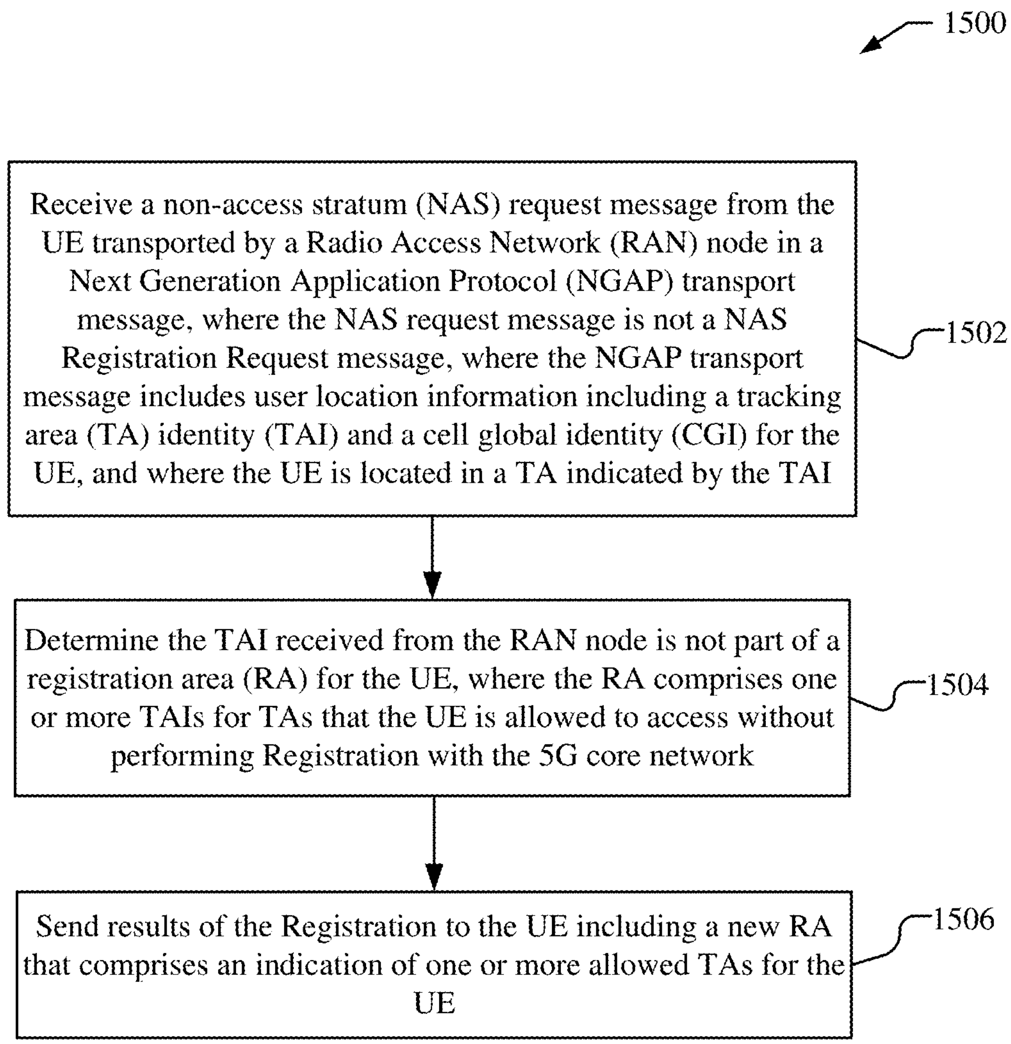
FIG. 15 shows a flowchart of an example procedure for supporting satellite wireless access by a user equipment to a serving public land mobile network (PLMN), performed by a network node.

The medium 1318 and/or memory 1316 may store instructions or program code 1320 that contain executable code or software instructions that when executed by the one or more processors 1304 cause the one or more processors 1304 to operate as a special purpose computer programmed to perform the techniques disclosed herein (e.g. such as the signal flows of FIGS. 9, 10, and 11 and the process flow 1500 of FIG. 15). As illustrated in network node 1300, the medium 1318 and/or memory 1316 may include one or more components or modules that may be implemented by the one or more processors 1304 to perform the methodologies described herein. While the components or modules are illustrated as software in medium 1318 that is executable by the one or more processors 1304, it should be understood that the components or modules may be stored in memory 1316 or may be dedicated hardware either in the one or more processors 1304 or off the processors.

A number of software modules and data tables may reside in the medium 1318 and/or memory 1316 and be utilized by the one or more processors 1304 in order to manage both communications and the functionality described herein. It should be appreciated that the organization of the contents of the medium 1318 and/or memory 1316 as shown in network node 1300 is merely exemplary, and as such the functionality of the modules and/or data structures may be combined, separated, and/or be structured in different ways depending upon the implementation of the network node 1300. While the components or modules are illustrated as software in medium 1318 and/or memory 1316 that is executable by the one or more processors 1304, it should be understood that the components or modules may be firmware or dedicated hardware either in the one or more processors 1304 or off the processors.

The medium 1318 and/or memory 1316 may include a NAS module 1322 that when implemented by the one or more processors 1304 configures the one or more processors 1304 to receive and send messages, via the external interface 1302, related to a NAS procedures, e.g., as discussed herein. For example, the one or more processors 1304 may be configured to receive, via the external interface 1302, a NAS request from the UE transported by a RAN node in a NGAP transport message, which may include, e.g., user location information including a TAC and a CGI for the UE. The one or more processors 1304 may be configured to send, via the external interface 1302, a NAS Request reject message to the UE rejecting a NAS procedure associated with the NAS Request, which may include an indication to request Registration, e.g., as a cause value in the NAS Request reject message. The one or more processors 1304 may be configured to perform a NAS procedure, e.g., such as an NAS procedure associated with a received NAS Request. The one or more processors 1304 may be configured to send, via the external interface 1302, a NAS response message to the UE confirming that the NAS procedure was performed and which may also include an indication that the UE is to request Registration or the results of the Registration if already performed. For example, the one or more processors 1304 may be configured to send, via the external interface 1302, a NAS configuration update command to the UE, which may include the indication to request Registration or the results of the Registration.

The medium 1318 and/or memory 1316 may include an RA module 1324 that when implemented by the one or more processors 1304 configures the one or more processors 1304 to determine whether a TAC received in the NAS request from the UE from the RAN node is for a TA that is or is not part of a RA for the UE, wherein the RA includes one or more TAs that the UE is allowed to access without performing Registration with the core network.

The medium 1318 and/or memory 1316 may include a Registration module 1326 that when implemented by the one or more processors 1304 configures the one or more processors 1304 to perform a Registration of the UE. For example, the one or more processors 1304 may be configured to perform the Registration of the UE by sending to the UE an indication to request Registration, via the external interface 1302, e.g., in a NAS Request reject message or a NAS response message. The one or more processors 1304 may be configured to receive, via the external interface 1302, a NAS Registration request message from the UE. The one or more processors 1304 may be configured to send, via the external interface 1302, a NAS Registration accept message to the UE that may include the results of the Registration. The one or more processors 1304 may be configured to perform an implicit Registration without receiving a NAS Registration request from the UE.

The medium 1318 and/or memory 1316 may include a results module 1328 that when implemented by the one or more processors 1304 configures the one or more processors 1304 to send, via the external interface 1302, results of the Registration to the UE including a new RA that may include an indication of one or more allowed TAs for the UE. The one or more processors 1304, for example, may be configured to results of the Registration in a NAS Registration accept message, NAS response message, or NAS configuration update command message.

The methodologies described herein may be implemented by various means depending upon the application. For example, these methodologies may be implemented in hardware, firmware, software, or any combination thereof. For a hardware implementation, the one or more processors 1304 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of network node 1300 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 1318 or memory 1316 and executed by one or more processors 1304, causing the one or more processors 1304 to operate as a special purpose computer programmed to perform the techniques disclosed herein. Memory may be implemented within the one or processors 1304 or external to the one or more processors 1304. As used herein the term “memory” refers to any type of long term, short term, volatile, nonvolatile, or other memory and is not to be limited to any particular type of memory or number of memories, or type of media upon which memory is stored.

If implemented in firmware and/or software, the functions performed by network node 1300 may be stored as one or more instructions or code on a non-transitory computer-readable storage medium such as medium 1318 or memory 1316. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for network node 1300 may be provided as signals on transmission media included in a communication apparatus. For example, a communication apparatus comprising part or all of network node 1300 may include a transceiver having signals indicative of instructions and data. The instructions and data are stored on non-transitory computer readable media, e.g., medium 1318 or memory 1316, and are configured to cause the one or more processors 1304 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

FIG. 14 shows a flowchart of an example procedure 1400 for supporting satellite wireless access by a user equipment (e.g. a UE 105, UE 902, UE 1002, UE 1102) to a serving public land mobile network (PLMN), performed by the UE.

As illustrated, at block 1402, the UE may send a non-access stratum (NAS) request message to a network node (e.g. an AMF 122) in a 5G core network (e.g. a 5GCN 110) via a Radio Access Network (RAN) node (e.g. a gNB 106, 202 or 307), where the NAS request message is not a NAS Registration Request message, where the NAS request message is forwarded to the network node by the RAN node in a Next Generation Application Protocol (NGAP) transport message, where the NGAP transport message includes user location information including a tracking area (TA) identity (TAI) and a cell global identity (CGI) for the UE, where the TAI is not part of a registration area (RA) for the UE, where the RA comprises one or more TAIs for TAs that the UE is allowed to access without performing Registration update with the core network, and where the UE is located in a TA indicated by the TAI, e.g., as illustrated in stages 5-8 of FIGS. 9, 10, and 11. In one implementation, for example, the UE sends the NAS request using a satellite radio cell for the RAN node, where the satellite radio cell indicates support for at least one TAI in the RA for the UE.

A means for sending a non-access stratum (NAS) request message to a network node in a 5G core network via a Radio Access Network (RAN) node, where the NAS request message is not a NAS Registration Request message, where the NAS request message is forwarded to the network node by the RAN node in a Next Generation Application Protocol (NGAP) transport message, where the NGAP transport message includes user location information including a tracking area (TA) identity (TAI) and a cell global identity (CGI) for the UE, where the TAI is not part of a registration area (RA) for the UE, where the RA comprises one or more TAIs for TAs that the UE is allowed to access without performing Registration update with the core network, and where the UE is located in a TA indicated by the TAI may include, e.g., the via the satellite transceiver 1203 or wireless transceiver 1202, and one or more processors 1204 with dedicated hardware or implementing executable code or software instructions in memory 1216 and/or medium 1218 in UE 1200, such as the NAS module 1222, shown in FIG. 12.

At block 1404, the UE receives from the network node results of a Registration performed by the network node, the results including a new RA that comprises an indication of one or more allowed TAs for the UE, e.g., as illustrated at stage 12 of FIG. 9, stage 14 of FIG. 10 and stages 11 or 12 of FIG. 11. A means for receiving from the network node results of a Registration performed by the network node, the results including a new RA that comprises an indication of one or more allowed TAs for the UE may include, e.g., the via the satellite transceiver 1203 or wireless transceiver 1202, and one or more processors 1204 with dedicated hardware or implementing executable code or software instructions in memory 1216 and/or medium 1218 in UE 1200, such as the Registration module 1224, shown in FIG. 12.

In one implementation, the TAI may be included in the new RA, e.g. as discussed for stage 11 of FIG. 9, stage 13 of FIG. 10 and stage 10 of FIG. 11.

In one implementation, the UE may receive from the network node an indication to request Registration, e.g., as illustrated at stage 9 of FIG. 9, and stages 10 or 11 of FIG. 10. A means for receiving from the network node an indication to request Registration may include, e.g., the via the satellite transceiver 1203 or wireless transceiver 1202, and one or more processors 1204 with dedicated hardware or implementing executable code or software instructions in memory 1216 and/or medium 1218 in UE 1200, such as the Registration module 1224, shown in FIG. 12. The UE may send a NAS Registration Request message to the network node, e.g., as illustrated at stages 10 of FIG. 9 and stage 12 of FIG. 10. A means for sending a NAS Registration Request message to the network node may include, e.g., the via the satellite transceiver 1203 or wireless transceiver 1202, and one or more processors 1204 with dedicated hardware or implementing executable code or software instructions in memory 1216 and/or medium 1218 in UE 1200, such as the Registration module 1224, shown in FIG. 12. The UE may receive a NAS Registration Accept message from the network node, where the NAS Registration Accept message includes the new RA for the UE, e.g., as illustrated at stage 12 of FIG. 9 and stage 14 of FIG. 10. A means for receiving a NAS Registration Accept message from the network node, where the NAS Registration Accept message includes the new RA for the UE may include, e.g., the via the satellite transceiver 1203 or wireless transceiver 1202, and one or more processors 1204 with dedicated hardware or implementing executable code or software instructions in memory 1216 and/or medium 1218 in UE 1200, such as the Registration module 1224, shown in FIG. 12.

In one implementation, the UE receives a NAS reject message from the network node rejecting a NAS procedure associated with the NAS request, e.g., as illustrated stage 9 of FIG. 9. A means for receiving a NAS reject message from the network node rejecting a NAS procedure associated with the NAS request may include, e.g., the via the satellite transceiver 1203 or wireless transceiver 1202, and one or more processors 1204 with dedicated hardware or implementing executable code or software instructions in memory 1216 and/or medium 1218 in UE 1200, such as the NAS module 1222, shown in FIG. 12. The UE may send a second NAS request to the network node after receiving the results of the Registration, where the second NAS request message comprises a request for the NAS procedure, and where the second NAS request message is forwarded by the RAN node in a second NGAP transport message, e.g., as illustrated stages 13 and 15 of FIG. 9. A means for sending a second NAS request to the network node after receiving the results of the Registration, where the second NAS request message comprises a request for the NAS procedure, and where the second NAS request message is forwarded by the RAN node in a second NGAP transport message may include, e.g., the via the satellite transceiver 1203 or wireless transceiver 1202, and one or more processors 1204 with dedicated hardware or implementing executable code or software instructions in memory 1216 and/or medium 1218 in UE 1200, such as the NAS module 1222, shown in FIG. 12. The NAS reject message may include the indication to request Registration, e.g. as discussed for stage 9 of FIG. 9. For example, the indication to request Registration may be a cause value in the NAS reject message.

In one implementation, the network node performs a NAS procedure associated with the NAS request, and the UE may further receive a NAS response message from the network node confirming that the NAS procedure was performed, e.g., as illustrated at stage 10 of FIG. 10. A means for receiving a NAS response message from the network node confirming that the NAS procedure was performed may include, e.g., the via the satellite transceiver 1203 or wireless transceiver 1202, and one or more processors 1204 with dedicated hardware or implementing executable code or software instructions in memory 1216 and/or medium 1218 in UE 1200, such as the NAS module 1222, shown in FIG. 12. The indication to request Registration, for example, may be included in the NAS response message. The UE may further receive a NAS configuration update command from the network node that includes the indication to request Registration, e.g., as illustrated at stage 11 of FIG. 10. A means for receiving a NAS configuration update command from the network node that includes the indication to request Registration may include, e.g., the via the satellite transceiver 1203 or wireless transceiver 1202, and one or more processors 1204 with dedicated hardware or implementing executable code or software instructions in memory 1216 and/or medium 1218 in UE 1200, such as the NAS module 1222, shown in FIG. 12. The NAS configuration update command may be received before the NAS response message is received. The NAS configuration update command may alternatively be received after the NAS response message is received.

In one implementation, the network node performs the Registration of the UE without the UE sending a NAS Registration request to the network node, e.g., as illustrated in stage 10 of FIG. 11. The network node may perform a NAS procedure associated with the NAS request message, and the UE may receive a NAS response message from the network node for the NAS procedure, where the NAS response message confirms that the NAS procedure was performed, and where the results of the Registration are included in the NAS response message, e.g., as illustrated at stages 9 and 11 of FIG. 11. A means for receiving a NAS response message from the network node for the NAS procedure, where the NAS response message confirms that the NAS procedure was performed, and where the results of the Registration are included in the NAS response message may include, e.g., the via the satellite transceiver 1203 or wireless transceiver 1202, and one or more processors 1204 with dedicated hardware or implementing executable code or software instructions in memory 1216 and/or medium 1218 in UE 1200, such as the NAS module 1222, shown in FIG. 12. In one implementation, the UE may receive a NAS configuration update command message from the network node that includes the results of the Registration, e.g., as illustrated in stage 12 of FIG. 11. A means for receiving a NAS configuration update command message from the network node that includes the results of the Registration may include, e.g., the via the satellite transceiver 1203 or wireless transceiver 1202, and one or more processors 1204 with dedicated hardware or implementing executable code or software instructions in memory 1216 and/or medium 1218 in UE 1200, such as the NAS module 1222, shown in FIG. 12.

FIG. 15 shows a flowchart of an example procedure 1500 for supporting satellite wireless access by a user equipment (e.g. a UE 105, UE 902, UE 1002, UE 1102) to a serving public land mobile network (PLMN), performed by a network node (e.g., an AMF 122, AMF 908, AMF 1008, AMF 1108) in a 5G core network (e.g. a 5GCN 110).

As illustrated, at block 1502, the network node receives a non-access stratum (NAS) request message from the UE transported by a Radio Access Network (RAN) node (e.g. a gNB 106, 202 or 307) in a Next Generation Application Protocol (NGAP) transport message, where the NAS request message is not a NAS Registration Request message, where the NGAP transport message includes user location information including a tracking area (TA) identity (TAI) and a cell global identity (CGI) for the UE, and where the UE is located in a TA indicated by the TAI, e.g., as illustrated by stages 5-7 of FIGS. 9, 10, and 11. A means for receiving a NAS request message from the UE transported by a RAN node in an NGAP transport message, where the NAS request message is not a NAS Registration Request message, where the NGAP transport message includes user location information including a TAI and a CGI for the UE, and where the UE is located in a TA indicated by the TAI, may include, e.g., the external interface 1302 and one or more processors 1304 with dedicated hardware or implementing executable code or software instructions in memory 1316 and/or medium 1318 in network node 1300, such as the NAS module 1322, shown in FIG. 13.

At block 1504, the network node may determine the TAI received from the RAN node is not part of a registration area (RA) for the UE, where the RA comprises one or more TAIs for TAs that the UE is allowed to access without performing Registration with the 5G core network, e.g., as illustrated in stage 8 of FIGS. 9, 10, and 11. A means for determining the TAI received from the RAN node is not part of a registration area (RA) for the UE, where the RA comprises one or more TAIs for TAs that the UE is allowed to access without performing Registration with the 5G core network may include, e.g., the one or more processors 1304 with dedicated hardware or implementing executable code or software instructions in memory 1316 and/or medium 1318 in network node 1300, such as the RA module 1324, shown in FIG. 13.

At block 1506, the network node sends results of a Registration to the UE including a new RA that comprises an indication of one or more allowed TAs for the UE, e.g., as illustrated at stage 12 of FIG. 9, stage 14 of FIG. 10 and stages 11 or 12 of FIG. 11. A means for sending results of a Registration to the UE including a new RA that comprises an indication of one or more allowed TAs for the UE may include, e.g., the external interface 1302 and one or more processors 1304 with dedicated hardware or implementing executable code or software instructions in memory 1316 and/or medium 1318 in network node 1300, such as the NAS module 1322, the Registration module 1326, and the results module 1328, shown in FIG. 13.

In one implementation, the network node may include the TAI in the new RA, e.g. as discussed for stage 11 of FIG. 9, stage 13 of FIG. 10 and stage 10 of FIG. 11.

In one implementation, the network node may perform the Registration of the UE, e.g., as illustrated in stage 11 of FIG. 9, stage 13 of FIG. 10, and stage 10 of FIG. 11. The network node, for example, may perform the Registration of the UE before sending the results of the Registration to the UE. A means for performing the Registration of the UE may include, e.g., the external interface 1302 and one or more processors 1304 with dedicated hardware or implementing executable code or software instructions in memory 1316 and/or medium 1318 in network node 1300, such as the Registration module 1326, shown in FIG. 13.

In one implementation, the network node performs the Registration of the UE by sending to the UE an indication to request Registration, e.g., as illustrated at stage 9 of FIG. 9, and stages 10 or 11 of FIG. 10. A means for sending to the UE an indication to request Registration may include, e.g., the external interface 1302 and one or more processors 1304 with dedicated hardware or implementing executable code or software instructions in memory 1316 and/or medium 1318 in network node 1300, such as the Registration module 1326, shown in FIG. 13. The network node may receive a NAS Registration request message from the UE, e.g., as illustrated at stages 10 of FIG. 9 and stage 12 of FIG. 10. A means for receiving a NAS Registration request message from the UE may include, e.g., the external interface 1302 and one or more processors 1304 with dedicated hardware or implementing executable code or software instructions in memory 1316 and/or medium 1318 in network node 1300, such as the Registration module 1326, shown in FIG. 13. The network node may send a NAS Registration Accept message to the UE, where the NAS Registration Accept message includes the results of the Registration, e.g., as illustrated at stage 12 of FIG. 9 and stage 14 of FIG. 10. A means for sending a NAS Registration Accept message to the UE, wherein the NAS Registration Accept message includes the results of the Registration may include, e.g., the external interface 1302 and one or more processors 1304 with dedicated hardware or implementing executable code or software instructions in memory 1316 and/or medium 1318 in network node 1300, such as the Registration module 1326 and the Results module 1328, shown in FIG. 13.

In one implementation, the network node sends a NAS reject message to the UE rejecting a NAS procedure associated with the NAS request, e.g., as illustrated stage 9 of FIG. 9. A means for sending a NAS reject message to the UE rejecting a NAS procedure associated with the NAS request may include, e.g., the external interface 1302 and one or more processors 1304 with dedicated hardware or implementing executable code or software instructions in memory 1316 and/or medium 1318 in network node 1300, such as the NAS module 1322, shown in FIG. 13. The network node may receive a second NAS request from the UE transported by the RAN node in a second NGAP transport message after sending the Registration Accept message to the UE, where the second NAS request comprises a request for the NAS procedure, e.g., as illustrated at stages 13-15 of FIG. 9. A means for receiving a second NAS request from the UE transported by the RAN node in a second NGAP transport message after sending the Registration Accept message to the UE, where the second NAS request comprises a request for the NAS procedure may include, e.g., the external interface 1302 and one or more processors 1304 with dedicated hardware or implementing executable code or software instructions in memory 1316 and/or medium 1318 in network node 1300, such as the NAS module 1322, shown in FIG. 13. The NAS reject message may include the indication to request Registration. For example, the indication to request Registration may be a cause value in the NAS reject message.

In one implementation, the network node performs a NAS procedure associated with the NAS request e.g., as illustrated at stage 9 of FIG. 10. The means for performing a NAS procedure associated with the NAS request may include, e.g., the external interface 1302 and one or more processors 1304 with dedicated hardware or implementing executable code or software instructions in memory 1316 and/or medium 1318 in network node 1300, such as the NAS module 1322, shown in FIG. 13. The network node may send a NAS response message to the UE confirming that the NAS procedure was performed e.g., as illustrated at stage 10 of FIG. 10. A means for sending a NAS response message to the UE confirming that the NAS procedure was performed may include, e.g., the external interface 1302 and one or more processors 1304 with dedicated hardware or implementing executable code or software instructions in memory 1316 and/or medium 1318 in network node 1300, such as the NAS module 1322, shown in FIG. 13. The indication to request Registration, for example, may be included in the NAS response message. The network node may further send a NAS configuration update command to the UE that includes the indication to request Registration, e.g., as illustrated at stage 11 of FIG. 10. A means for sending a NAS configuration update command to the UE that includes the indication to request Registration may include, e.g., the external interface 1302 and one or more processors 1304 with dedicated hardware or implementing executable code or software instructions in memory 1316 and/or medium 1318 in network node 1300, such as the NAS module 1322, shown in FIG. 13. The NAS configuration update command may be sent to the UE before sending the NAS response message. The NAS configuration update command may alternatively be sent to the UE after sending the NAS response message.

In one implementation, the network node performs the Registration of the UE by performing an implicit Registration without receiving a NAS Registration Request from the UE, e.g., as illustrated in stage 10 of FIG. 11. A means for performing an implicit Registration without receiving a NAS Registration Request from the UE may include, e.g., the external interface 1302 and one or more processors 1304 with dedicated hardware or implementing executable code or software instructions in memory 1316 and/or medium 1318 in network node 1300, such as the Registration module 1326, shown in FIG. 13. The network node may perform a NAS procedure associated with the NAS request, e.g., as illustrated in stage 9 of FIG. 11. A means for performing a NAS procedure associated with the NAS Request may include, e.g., the external interface 1302 and one or more processors 1304 with dedicated hardware or implementing executable code or software instructions in memory 1316 and/or medium 1318 in network node 1300, such as the NAS module 1322, shown in FIG. 13. The network node may send a NAS response message to the UE confirming that the NAS procedure was performed, where the results of the Registration are included in the NAS response message, e.g., as illustrated in stage 11 of FIG. 11. A means for sending a NAS response message to the UE confirming that the NAS procedure was performed, wherein the results of the Registration are included in the NAS response message may include, e.g., the external interface 1302 and one or more processors 1304 with dedicated hardware or implementing executable code or software instructions in memory 1316 and/or medium 1318 in network node 1300, such as the NAS module 1322, shown in FIG. 13. In one implementation, the network node may send a NAS configuration update command message to the UE that includes the results of the Registration, e.g., as illustrated in stage 12 of FIG. 11. A means for sending a NAS configuration update command message to the UE that includes the results of the Registration may include, e.g., the external interface 1302 and one or more processors 1304 with dedicated hardware or implementing executable code or software instructions in memory 1316 and/or medium 1318 in network node 1300, such as the NAS module 1322, shown in FIG. 13.

Abbreviations used herein may be identified in Table 1 as follows:

TABLE 1

| | |
|---|---|
| EM | Emergency |
| ES | Earth Station |
| GEO | Geostationary Earth Orbit |
| ISL | Inter-Satellite Links |
| LEO | Low Earth Orbit |
| LI | Lawful Interception |
| MEO | Medium Earth Orbit |
| MNO | Mobile Network Operator |
| NGEO | Non-Geostationary Earth Orbiting |
| NTN | Non-Terrestrial Network |
| gNB | satellite Node B |
| SV | Space Vehicle |
| SVO | SV Operator |
| TA | Tracking Area |
| TAC | Tracking Area Code |
| TAI | Tracking Area Identity |
| WEA | Wireless Emergency Alerting |

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device". "wireless device" or "user equipment") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, a "mobile station" or "user equipment" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station" or "user equipment." A mobile device or user equipment (UE) may also be referred to as a mobile terminal, a terminal, a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not, in some embodiments, comply with part or all of such one or more standards.

In view of this description embodiments may include different combinations of features. Implementation examples are described in the following numbered clauses:

Clause 1. A method performed by a network node in a 5G core network for supporting satellite wireless access by a user equipment (UE) to a serving public land mobile network (PLMN), the method comprising: receiving a non-access stratum (NAS) request message from the UE transported by a Radio Access Network (RAN) node in a Next Generation Application Protocol (NGAP) transport message, wherein the NAS request message is not a NAS Registration Request message, wherein the NGAP transport message includes user location information including a tracking area (TA) identity (TAI) and a cell global identity (CGI) for the UE, wherein the UE is located in a TA indicated by the TAI; determining the TAI received from the RAN node is not part of a registration area (RA) for the UE, wherein the RA comprises one or more TAIs for TAs that the UE is allowed to access without performing Registration with the 5G core network; and sending results of a Registration to the UE including a new RA that comprises an indication of one or more allowed TAs for the UE.

Clause 2. The method of clause 1, further comprising including the TAI in the new RA.

Clause 3. The method of clause 1, further comprising performing the Registration of the UE.

Clause 4. The method of clause 3, wherein performing the Registration of the UE comprises: sending to the UE an indication to request Registration; receiving a NAS Registration Request message from the UE; and sending a NAS Registration Accept message to the UE, wherein the NAS Registration Accept message includes the results of the Registration.

Clause 5. The method of clause 4, further comprising: sending a NAS reject message to the UE rejecting a NAS procedure associated with the NAS request; and receiving a second NAS request from the UE transported by the RAN node in a second NGAP transport message after sending the Registration Accept message to the UE, wherein the second NAS request comprises a request for the NAS procedure.

Clause 6. The method of clause 5, wherein the NAS reject message includes the indication to request Registration.

Clause 7. The method of clause 6, wherein the indication to request Registration is a cause value in the NAS reject message.

Clause 8. The method of clause 4, further comprising: performing a NAS procedure associated with the NAS request; and sending a NAS response message to the UE confirming that the NAS procedure was performed.

Clause 9. The method of clause 8, wherein the indication to request Registration is included in the NAS response message.

Clause 10. The method of clause 8, further comprising sending a NAS configuration update command to the UE that includes the indication to request Registration.

Clause 11. The method of clause 10, wherein the NAS configuration update command is sent to the UE before sending the NAS response message.

Clause 12. The method of clause 10, wherein the NAS configuration update command is sent to the UE after sending the NAS response message.

Clause 13. The method of clause 3, wherein performing the Registration of the UE comprises performing an implicit Registration without receiving a NAS Registration Request from the UE.

Clause 14. The method of clause 13, further comprising: performing a NAS procedure associated with the NAS request; and sending a NAS response message to the UE confirming that the NAS procedure was performed, wherein the results of the Registration are included in the NAS response message.

Clause 15. The method of clause 13, further comprising: sending a NAS configuration update command message to the UE that includes the results of the Registration.

Clause 16. A network node in a 5G core network configured for supporting satellite wireless access by a user equipment (UE) to a serving public land mobile network (PLMN), the network node comprising: an external interface configured to communicate network entities; at least one memory; at least one processor coupled to the external interface and the at least one memory, wherein the at least one processor is configured to: receive, via the external interface, a non-access stratum (NAS) request message from the UE transported by a Radio Access Network (RAN) node in a Next Generation Application Protocol (NGAP) transport message, wherein the NAS request message is not a NAS Registration Request message, wherein the NGAP transport message includes user location information including a tracking area (TA) identity (TAI) and a cell global identity (CGI) for the UE, wherein the UE is located in a TA indicated by the TAI; determine the TAI received from the RAN node is not part of a registration area (RA) for the UE, wherein the RA comprises one or more TAIs for TAs that the UE is allowed to access without performing Registration with the 5G core network; and send, via the external interface, results of a Registration to the UE including a new RA that comprises an indication of one or more allowed TAs for the UE.

Clause 17. The network node of clause 16, wherein the at least one processor is configured to include the TAI in the new RA.

Clause 18. The network node of clause 16, wherein the at least one processor is further configured to perform the Registration of the UE.

Clause 19. The network node of clause 18, wherein the at least one processor is configured to perform the Registration of the UE by being configured to: send to the UE an indication to request Registration; receive a NAS Registration Request message from the UE; and send a NAS Registration Accept message to the UE, wherein the NAS Registration Accept message includes the results of the Registration.

Clause 20. The network node of clause 19, wherein the at least one processor is further configured to: send a NAS reject message to the UE rejecting a NAS procedure associated with the NAS request; and receive a second NAS request from the UE transported by the RAN node in a second NGAP transport message after sending the Registration Accept message to the UE, wherein the second NAS request comprises a request for the NAS procedure.

Clause 21. The network node of clause 20, wherein the NAS reject message includes the indication to request Registration.

Clause 22. The network node of clause 21, wherein the indication to request Registration is a cause value in the NAS reject message.

Clause 23. The network node of clause 19, wherein the at least one processor is further configured to: perform a NAS procedure associated with the NAS request; and send a NAS response message to the UE confirming that the NAS procedure was performed.

Clause 24. The network node of clause 23, wherein the indication to request Registration is included in the NAS response message.

Clause 25. The network node of clause 23, wherein the at least one processor is further configured to send a NAS configuration update command to the UE that includes the indication to request Registration.

Clause 26. The network node of clause 25, wherein the NAS configuration update command is sent to the UE before sending the NAS response message.

Clause 27. The network node of clause 25, wherein the NAS configuration update command is sent to the UE after sending the NAS response message.

Clause 28. The network node of clause 18, wherein the at least one processor is configured to perform the Registration of the UE by being configured to perform an implicit Registration without receiving a NAS Registration Request from the UE.

Clause 29. The network node of clause 28, wherein the at least one processor is further configured to: perform a NAS procedure associated with the NAS request; and send a NAS response message to the UE confirming that the NAS procedure was performed, wherein the results of the Registration are included in the NAS response message.

Clause 30. The network node of clause 28, wherein the at least one processor is further configured to: send a NAS configuration update command message to the UE that includes the results of the Registration.

Clause 31. A network node in a 5G core network configured for supporting satellite wireless access by a user equipment (UE) to a serving public land mobile network (PLMN), comprising: means for receiving a non-access stratum (NAS) request message from the UE transported by a Radio Access Network (RAN) node in a Next Generation Application Protocol (NGAP) transport message, wherein the NAS request message is not a NAS Registration Request message, wherein the NGAP transport message includes user location information including a tracking area (TA) identity (TAI) and a cell global identity (CGI) for the UE, wherein the UE is located in a TA indicated by the TAI; means for determining the TAI received from the RAN node is not part of a registration area (RA) for the UE, wherein the RA comprises one or more TAIs for TAs that the UE is allowed to access without performing Registration with the 5G core network; and means for sending results of a Registration to the UE including a new RA that comprises an indication of one or more allowed TAs for the UE.

Clause 32. The network node of clause 31, further comprising means for including the TAI in the new RA.

Clause 33. The network node of clause 31, further comprising means for performing the Registration of the UE.

Clause 34. The network node of clause 33, wherein the means for performing the Registration of the UE comprises: means for sending to the UE an indication to request Registration; means for receiving a NAS Registration Request message from the UE; and means for sending a NAS Registration Accept message to the UE, wherein the NAS Registration Accept message includes the results of the Registration.

Clause 35. The network node of clause 34, further comprising: means for sending a NAS reject message to the UE rejecting a NAS procedure associated with the NAS request; and means for receiving a second NAS request from the UE transported by the RAN node in a second NGAP transport message after sending the Registration Accept message to the UE, wherein the second NAS request comprises a request for the NAS procedure.

Clause 36. The network node of clause 35, wherein the NAS reject message includes the indication to request Registration.

Clause 37. The network node of clause 36, wherein the indication to request Registration is a cause value in the NAS reject message.

Clause 38. The network node of clause 34, further comprising: means for performing a NAS procedure associated with the NAS request; and means for sending a NAS response message to the UE confirming that the NAS procedure was performed.

Clause 39. The network node of clause 38, wherein the indication to request Registration is included in the NAS response message.

Clause 40. The network node of clause 38, further comprising means for sending a NAS configuration update command to the UE that includes the indication to request Registration.

Clause 41. The network node of clause 40, wherein the NAS configuration update command is sent to the UE before sending the NAS response message.

Clause 42. The network node of clause 40, wherein the NAS configuration update command is sent to the UE after sending the NAS response message.

Clause 43. The network node of clause 33, wherein the means for performing the Registration of the UE comprises means for performing an implicit Registration without receiving a NAS Registration Request from the UE.

Clause 44. The network node of clause 43, further comprising: means for performing a NAS procedure associated with the NAS request; and means for sending a NAS response message to the UE confirming that the NAS procedure was performed, wherein the results of the Registration are included in the NAS response message.

Clause 45. The network node of clause 43, further comprising: means for sending a NAS configuration update command message to the UE that includes the results of the Registration.

Clause 46. A non-transitory storage medium including program code stored thereon, the program code is operable to configure at least one processor in a network node in a 5G core network for supporting satellite wireless access by a user equipment (UE) to a serving public land mobile network (PLMN), the program code comprising instructions to: receive receiving a non-access stratum (NAS) request message from the UE transported by a Radio Access Network (RAN) node in a Next Generation Application Protocol (NGAP) transport message, wherein the NAS request message is not a NAS Registration Request message, wherein the NGAP transport message includes user location information including a tracking area (TA) identity (TAI) and a cell global identity (CGI) for the UE, wherein the UE is located in a TA indicated by the TAI; determine the TAI received from the RAN node is not part of a registration area (RA) for the UE, wherein the RA comprises one or more TAIs for TAs that the UE is allowed to access without performing Registration with the 5G core network; and send results of a Registration to the UE including a new RA that comprises an indication of one or more allowed TAs for the UE.

Clause 47. The non-transitory storage medium of clause 46, wherein the program code further comprises instructions to include the TAI in the new RA.

Clause 48. The non-transitory storage medium of clause 46, wherein the program code further comprises instructions to perform the Registration of the UE.

Clause 49. The non-transitory storage medium of clause 48, wherein the instructions to perform the Registration of the UE comprises instructions to: send to the UE an indication to request Registration; receive a NAS Registration Request message from the UE; and send a NAS Registration Accept message to the UE, wherein the NAS Registration Accept message includes the results of the Registration.

Clause 50. The non-transitory storage medium of clause 49, wherein the program code further comprises instructions to: send a NAS reject message to the UE rejecting a NAS procedure associated with the NAS request; and receive a second NAS request from the UE transported by the RAN node in a second NGAP transport message after sending the Registration Accept message to the UE, wherein the second NAS request comprises a request for the NAS procedure.

Clause 51. The non-transitory storage medium of clause 50, wherein the NAS reject message includes the indication to request Registration.

Clause 52. The non-transitory storage medium of clause 51, wherein the indication to request Registration is a cause value in the NAS reject message.

Clause 53. The non-transitory storage medium of clause 49, wherein the program code further comprises instructions to: perform a NAS procedure associated with the NAS request; and send a NAS response message to the UE confirming that the NAS procedure was performed.

Clause 54. The non-transitory storage medium of clause 53, wherein the indication to request Registration is included in the NAS response message.

Clause 55. The non-transitory storage medium of clause 53, wherein the program code further comprises instructions to send a NAS configuration update command to the UE that includes the indication to request Registration.

Clause 56. The non-transitory storage medium of clause 55, wherein the NAS configuration update command is sent to the UE before sending the NAS response message.

Clause 57. The non-transitory storage medium of clause 55, wherein the NAS configuration update command is sent to the UE after sending the NAS response message.

Clause 58. The non-transitory storage medium of clause 48, wherein the instructions to perform the Registration of the UE comprise instructions to perform an implicit Registration without receiving a NAS Registration Request from the UE.

Clause 59. The non-transitory storage medium of clause 58, wherein the program code further comprises instructions to: perform a NAS procedure associated with the NAS request; and send a NAS response message to the UE confirming that the NAS procedure was performed, wherein the results of the Registration are included in the NAS response message.

Clause 60. The non-transitory storage medium of clause 58, wherein the program code further comprises instructions to: send a NAS configuration update command message to the UE that includes the results of the Registration.

Clause 61. A method performed by a user equipment (UE) for supporting satellite wireless access to a serving public land mobile network (PLMN), the method comprising: sending a non-access stratum (NAS) request message to a network node in a 5G core network via a Radio Access Network (RAN) node, wherein the NAS request message is not a NAS Registration Request message, wherein the NAS request message is forwarded to the network node by the RAN node in a Next Generation Application Protocol (NGAP) transport message, wherein the NGAP transport message includes user location information including a tracking area (TA) identity (TAI) and a cell global identity (CGI) for the UE, wherein the TAI is not part of a registration area (RA) for the UE, wherein the RA comprises one or more TAIs for TAs that the UE is allowed to access without performing Registration update with the core network, wherein the UE is located in a TA indicated by the TAI; and receiving from the network node results of a Registration performed by the network node, the results including a new RA that comprises an indication of one or more allowed TAs for the UE.

Clause 62. The method of clause 61, wherein the TAI is included in the new RA.

Clause 63. The method of clause 61, wherein the UE sends the NAS request using a satellite radio cell for the RAN node, wherein the satellite radio cell indicates support for at least one TAI in the RA for the UE.

Clause 64. The method of clause 61, further comprising: receiving from the network node an indication to request Registration; sending a NAS Registration Request message to the network node; and receiving a NAS Registration Accept message from the network node, wherein the NAS Registration Accept message includes the new RA for the UE.

Clause 65. The method of clause 64, further comprising: receiving a NAS reject message from the network node rejecting a NAS procedure associated with the NAS request message; and sending a second NAS request message to the network node after receiving the results of the Registration, wherein the second NAS request message comprises a request for the NAS procedure, wherein the second NAS request message is forwarded by the RAN node in a second NGAP transport message.

Clause 66. The method of clause 65, wherein the NAS reject message includes the indication to request Registration.

Clause 67. The method of clause 66, wherein the indication to request Registration is a cause value in the NAS reject message.

Clause 68. The method of clause 64, wherein the network node performs a NAS procedure associated with the NAS request, the method further comprising: receiving a NAS response message from the network node confirming that the NAS procedure was performed.

Clause 69. The method of clause 68, wherein the indication to request Registration is included in the NAS response message.

Clause 70. The method of clause 68, further comprising receiving a NAS configuration update command from the network node that includes the indication to request Registration.

Clause 71. The method of clause 70, wherein the NAS configuration update command is received before the NAS response message is received.

Clause 72. The method of clause 70, wherein the NAS configuration update command is received after the NAS response message is received.

Clause 73. The method of clause 61, wherein the network node performs the Registration of the UE without the UE sending a NAS Registration Request to the network node.

Clause 74. The method of clause 73, wherein the network node performs a NAS procedure associated with the NAS request message, the method further comprising: receiving a NAS response message from the network node for the NAS procedure, wherein the NAS response message confirms that the NAS procedure was performed, wherein the results of the Registration are included in the NAS response message.

Clause 75. The method of clause 73, further comprising: receiving a NAS configuration update command message from the network node that includes the results of the Registration.

Clause 76. A user equipment (UE) configured for supporting satellite wireless access to a serving public land mobile network (PLMN), the UE comprising: a wireless transceiver configured to wirelessly communicate with a communication satellite; at least one memory; at least one processor coupled to the wireless transceiver and the at least one memory, wherein the at least one processor is configured to: send, via the wireless transceiver, a non-access stratum (NAS) request message to a network node in a 5G core network via a Radio Access Network (RAN) node, wherein the NAS request message is not a NAS Registration Request message, wherein the NAS request message is forwarded to the network node by the RAN node in a Next Generation Application Protocol (NGAP) transport message, wherein the NGAP transport message includes user location information including a tracking area (TA) identity (TAI) and a cell global identity (CGI) for the UE, wherein the TAI is not part of a registration area (RA) for the UE, wherein the RA comprises one or more TAIs for TAs that the UE is allowed to access without performing Registration update with the core network, wherein the UE is located in a TA indicated by the TAI; and receive, via the wireless transceiver, from the network node results of a Registration performed by the network node, the results including a new RA that comprises an indication of one or more allowed TAs for the UE.

Clause 77. The UE of clause 76, wherein the TAI is included in the new RA.

Clause 78. The UE of clause 76, wherein the UE sends the NAS request using a satellite radio cell for the RAN node, wherein the satellite radio cell indicates support for at least one TAI in the RA for the UE.

Clause 79. The UE of clause 76, wherein the at least one processor is further configured to: receive, via the wireless transceiver, from the network node an indication to request Registration; send, via the wireless transceiver, a NAS Registration Request message to the network node; and receive, via the wireless transceiver, a NAS Registration Accept message from the network node, wherein the NAS Registration Accept message includes the new RA for the UE.

Clause 80. The UE of clause 79, wherein the at least one processor is further configured to: receive, via the wireless transceiver, a NAS reject message from the network node rejecting a NAS procedure associated with the NAS request message; and send, via the wireless transceiver, a second NAS request message to the network node after receiving the results of the Registration, wherein the second NAS request message comprises a request for the NAS procedure, wherein the second NAS request message is forwarded by the RAN node in a second NGAP transport message.

Clause 81. The UE of clause 80, wherein the NAS reject message includes the indication to request Registration.

Clause 82. The UE of clause 81, wherein the indication to request Registration is a cause value in the NAS reject message.

Clause 83. The UE of clause 79, wherein the network node performs a NAS procedure associated with the NAS request, wherein the at least one processor is further configured to: receive, via the wireless transceiver, a NAS response message from the network node confirming that the NAS procedure was performed.

Clause 84. The UE of clause 83, wherein the indication to request Registration is included in the NAS response message.

Clause 85. The UE of clause 83, wherein the at least one processor is further configured to receive, via the wireless transceiver, a NAS configuration update command from the network node that includes the indication to request Registration.

Clause 86. The UE of clause 85, wherein the NAS configuration update command is received before the NAS response message is received.

Clause 87. The UE of clause 85, wherein the NAS configuration update command is received after the NAS response message is received.

Clause 88. The UE of clause 76, wherein the network node performs the Registration of the UE without the UE sending a NAS Registration Request to the network node.

Clause 89. The UE of clause 88, wherein the network node performs a NAS procedure associated with the NAS request message, wherein the at least one processor is further configured to: receive, via the wireless transceiver, a NAS response message from the network node for the NAS procedure, wherein the NAS response message confirms that the NAS procedure was performed, wherein the results of the Registration are included in the NAS response message.

Clause 90. The UE of clause 88, wherein the at least one processor is further configured to: receive, via the wireless transceiver, a NAS configuration update command message from the network node that includes the results of the Registration.

Clause 91. A user equipment (UE) configured for supporting satellite wireless access to a serving public land mobile network (PLMN), comprising: means for sending a non-access stratum (NAS) request message to a network node in a 5G core network via a Radio Access Network (RAN) node, wherein the NAS request message is not a NAS Registration Request message, wherein the NAS request message is forwarded to the network node by the RAN node in a Next Generation Application Protocol (NGAP) transport message, wherein the NGAP transport message includes user location information including a tracking area (TA) identity (TAI) and a cell global identity (CGI) for the UE, wherein the TAI is not part of a registration area (RA) for the UE, wherein the RA comprises one or more TAIs for TAs that the UE is allowed to access without performing Registration update with the core network, wherein the UE is located in a TA indicated by the TAI; and means for receiving from the network node results of a Registration performed by the network node, the results including a new RA that comprises an indication of one or more allowed TAs for the UE.

Clause 92. The UE of clause 91, wherein the TAI is included in the new RA.

Clause 93. The UE of clause 91, wherein the UE sends the NAS request using a satellite radio cell for the RAN node, wherein the satellite radio cell indicates support for at least one TAI in the RA for the UE.

Clause 94. The UE of clause 91, further comprising: means for receiving from the network node an indication to request Registration; means for sending a NAS Registration Request message to the network node; and means for receiving a NAS Registration Accept message from the network node, wherein the NAS Registration Accept message includes the new RA for the UE.

Clause 95. The UE of clause 94, further comprising: means for receiving a NAS reject message from the network node rejecting a NAS procedure associated with the NAS request message; and means for sending a second NAS request message to the network node after receiving the results of the Registration, wherein the second NAS request message comprises a request for the NAS procedure, wherein the second NAS request message is forwarded by the RAN node in a second NGAP transport message.

Clause 96. The UE of clause 95, wherein the NAS reject message includes the indication to request Registration.

Clause 97. The UE of clause 96, wherein the indication to request Registration is a cause value in the NAS reject message.

Clause 98. The UE of clause 94, wherein the network node performs a NAS procedure associated with the NAS request, the method further comprising: means for receiving a NAS response message from the network node confirming that the NAS procedure was performed.

Clause 99. The UE of clause 98, wherein the indication to request Registration is included in the NAS response message.

Clause 100. The UE of clause 98, further comprising means for receiving a NAS configuration update command from the network node that includes the indication to request Registration.

Clause 101. The UE of clause 100, wherein the NAS configuration update command is received before the NAS response message is received.

Clause 102. The UE of clause 100, wherein the NAS configuration update command is received after the NAS response message is received.

Clause 103. The UE of clause 91, wherein the network node performs the Registration of the UE without the UE sending a NAS Registration Request to the network node.

Clause 104. The UE of clause 103, wherein the network node performs a NAS procedure associated with the NAS request message, further comprising: means for receiving a NAS response message from the network node for the NAS procedure, wherein the NAS response message confirms that the NAS procedure was performed, wherein the results of the Registration are included in the NAS response message.

Clause 105. The UE of clause 103, further comprising: means for receiving a NAS configuration update command message from the network node that includes the results of the Registration.

Clause 106. A non-transitory storage medium including program code stored thereon, the program code is operable to configure at least one processor in a user equipment (UE) for supporting satellite wireless access to a serving public land mobile network (PLMN), the program code comprising instructions to: send a non-access stratum (NAS) request message to a network node in a 5G core network via a Radio Access Network (RAN) node, wherein the NAS request message is not a NAS Registration Request message, wherein the NAS request message is forwarded to the network node by the RAN node in a Next Generation Application Protocol (NGAP) transport message, wherein the NGAP transport message includes user location information including a tracking area (TA) identity (TAI) and a cell global identity (CGI) for the UE, wherein the TAI is not part of a registration area (RA) for the UE, wherein the RA comprises one or more TAIs for TAs that the UE is allowed to access without performing Registration update with the core network, wherein the UE is located in a TA indicated by the TAI; and receive from the network node results of a Registration performed by the network node, the results including a new RA that comprises an indication of one or more allowed TAs for the UE.

Clause 107. The non-transitory storage medium of clause 106, wherein the TAI is included in the new RA.

Clause 108. The non-transitory storage medium of clause 106, wherein the UE sends the NAS request using a satellite radio cell for the RAN node, wherein the satellite radio cell indicates support for at least one TAI in the RA for the UE.

Clause 109. The non-transitory storage medium of clause 106, wherein the program code further comprises instructions to: receive from the network node an indication to request Registration; send a NAS Registration Request message to the network node; and receive a NAS Registration Accept message from the network node, wherein the NAS Registration Accept message includes the new RA for the UE.

Clause 110. The non-transitory storage medium of clause 109, wherein the program code further comprises instructions to: receive a NAS reject message from the network node rejecting a NAS procedure associated with the NAS request message; and send a second NAS request message to the network node after receiving the results of the Registration, wherein the second NAS request message comprises a request for the NAS procedure, wherein the second NAS request message is forwarded by the RAN node in a second NGAP transport message.

Clause 111. The non-transitory storage medium of clause 110, wherein the NAS reject message includes the indication to request Registration.

Clause 112. The non-transitory storage medium of clause 111, wherein the indication to request Registration is a cause value in the NAS reject message.

Clause 113. The non-transitory storage medium of clause 109, wherein the network node performs a NAS procedure associated with the NAS request, wherein the program code further comprises instructions to: receive a NAS response message from the network node confirming that the NAS procedure was performed.

Clause 114. The non-transitory storage medium of clause 113, wherein the indication to request Registration is included in the NAS response message.

Clause 115. The non-transitory storage medium of clause 113, wherein the program code further comprises instructions to receive a NAS configuration update command from the network node that includes the indication to request Registration.

Clause 116. The non-transitory storage medium of clause 115, wherein the NAS configuration update command is received before the NAS response message is received.

Clause 117. The non-transitory storage medium of clause 115, wherein the NAS configuration update command is received after the NAS response message is received.

Clause 118. The non-transitory storage medium of clause 106, wherein the network node performs the Registration of the UE without the UE sending a NAS Registration Request to the network node.

Clause 119. The non-transitory storage medium of clause 118, wherein the network node performs a NAS procedure associated with the NAS request message, wherein the program code further comprises instructions to: receive a NAS response message from the network node for the NAS procedure, wherein the NAS response message confirms that the NAS procedure was performed, wherein the results of the Registration are included in the NAS response message.

Clause 120. The non-transitory storage medium of clause 118, wherein the program code further comprises instructions to: receive a NAS configuration update command message from the network node that includes the results of the Registration.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method performed by a network node in a 5G core network for supporting satellite wireless access by a user equipment (UE) to a serving public land mobile network (PLMN), the method comprising:

receiving a non-access stratum (NAS) request message from the UE transported by a Radio Access Network (RAN) node in a Next Generation Application Protocol (NGAP) transport message, wherein the NAS request message is not a NAS Registration Request message, wherein the NGAP transport message includes user location information including a tracking area (TA) identity (TAI) and a cell global identity (CGI) for the UE, wherein the UE is located in a TA indicated by the TAI;

determining the TAI received from the RAN node is not part of a registration area (RA) for the UE, wherein the RA comprises one or more TAIs for TAs that the UE is allowed to access without performing NAS Registration with the 5G core network;

performing a NAS Registration of the UE; and sending results of the NAS Registration to the UE including a new RA that comprises an indication of one or more allowed TAs for the UE.

2. The method of claim 1, further comprising including the TAI in the new RA.

3. The method of claim 1, wherein performing the NAS Registration of the UE comprises:

sending to the UE an indication to request Registration;

receiving a NAS Registration Request message from the UE; and sending a NAS Registration Accept message to the UE, wherein the NAS Registration Accept message includes the results of the NAS Registration.

4. The method of claim 3, further comprising:

sending a NAS reject message to the UE rejecting a NAS procedure associated with the NAS request message; and receiving a second NAS request message from the UE transported by the RAN node in a second NGAP transport message after sending the NAS Registration Accept message to the UE, wherein the second NAS request message comprises a request for the NAS procedure.

5. The method of claim 3, further comprising:

performing a NAS procedure associated with the NAS request message; and sending a NAS response message to the UE confirming that the NAS procedure was performed.

6. The method of claim 5, further comprising sending a NAS configuration update command to the UE that includes the indication to request Registration.

7. The method of claim 1, wherein performing the NAS Registration of the UE comprises performing an implicit Registration without receiving a NAS Registration Request from the UE.

8. A network node in a 5G core network configured for supporting satellite wireless access by a user equipment (UE) to a serving public land mobile network (PLMN), the network node comprising:

an external interface configured to communicate network entities;

at least one memory;

at least one processor coupled to the external interface and the at least one memory, wherein the at least one processor is configured to:

receive, via the external interface, a non-access stratum (NAS) request message from the UE transported by a Radio Access Network (RAN) node in a Next Generation Application Protocol (NGAP) transport message, wherein the NAS request message is not a NAS Registration Request message, wherein the NGAP transport message includes user location information including a tracking area (TA) identity (TAI) and a cell global identity (CGI) for the UE, wherein the UE is located in a TA indicated by the TAI;

determine the TAI received from the RAN node is not part of a registration area (RA) for the UE, wherein the RA comprises one or more TAIs for TAs that the UE is allowed to access without performing NAS Registration with the 5G core network;

perform a NAS Registration of the UE; and send, via the external interface, results of the NAS Registration to the UE including a new RA that comprises an indication of one or more allowed TAs for the UE.

9. The network node of claim 8, wherein the at least one processor is configured to include the TAI in the new RA.

10. The network node of claim 8, wherein the at least one processor is configured to perform the NAS Registration of the UE by being configured to:

send to the UE an indication to request Registration;

receive a NAS Registration Request message from the UE; and send a NAS Registration Accept message to the UE, wherein the NAS Registration Accept message includes the results of the NAS Registration.

11. The network node of claim 10, wherein the at least one processor is further configured to:

send a NAS reject message to the UE rejecting a NAS procedure associated with the NAS request message; and receive a second NAS request message from the UE transported by the RAN node in a second NGAP transport message after sending the NAS Registration Accept message to the UE, wherein the second NAS request message comprises a request for the NAS procedure.

12. The network node of claim 10, wherein the at least one processor is further configured to:

perform a NAS procedure associated with the NAS request message; and send a NAS response message to the UE confirming that the NAS procedure was performed.

13. The network node of claim 12, wherein the at least one processor is further configured to send a NAS configuration update command to the UE that includes the indication to request Registration.

14. The network node of claim 8, wherein the at least one processor is configured to perform the NAS Registration of the UE by being configured to perform an implicit Registration without receiving a NAS Registration Request from the UE.

15. A method performed by a user equipment (UE) for supporting satellite wireless access to a serving public land mobile network (PLMN), the method comprising:

sending a non-access stratum (NAS) request message to a network node in a 5G core network via a Radio Access Network (RAN) node, wherein the NAS request message is not a NAS Registration Request message, wherein the NAS request message is forwarded to the network node by the RAN node in a Next Generation Application Protocol (NGAP) transport message, wherein the NGAP transport message includes user location information including a tracking area (TA) identity (TAI) and a cell global identity (CGI) for the UE, wherein the TAI is not part of a registration area (RA) for the UE, wherein the RA comprises one or more TAIs for TAs that the UE is allowed to access without performing Registration update with the core network, wherein the UE is located in a TA indicated by the TAI; and receiving from the network node results of a NAS Registration performed by the network node, the results including a new RA that comprises an indication of one or more allowed TAs for the UE.

16. The method of claim 15, wherein the TAI is included in the new RA.

17. The method of claim 15, wherein the UE sends the NAS request message using a satellite radio cell for the RAN node, wherein the satellite radio cell indicates support for at least one TAI in the RA for the UE.

18. The method of claim 15, further comprising:

receiving from the network node an indication to request Registration;

sending a NAS Registration Request message to the network node; and receiving a NAS Registration Accept message from the network node, wherein the NAS Registration Accept message includes the new RA for the UE.

19. The method of claim 18, further comprising:

receiving a NAS reject message from the network node rejecting a NAS procedure associated with the NAS request message; and sending a second NAS request message to the network node after receiving the results of the NAS Registration, wherein the second NAS request message comprises a request for the NAS procedure, wherein the second NAS request message is forwarded by the RAN node in a second NGAP transport message.

20. The method of claim 18, wherein the network node performs a NAS procedure associated with the NAS request message, the method further comprising:

receiving a NAS response message from the network node confirming that the NAS procedure was performed.

21. The method of claim 20, further comprising receiving a NAS configuration update command from the network node that includes the indication to request Registration.

22. The method of claim 15, wherein the network node performs the NAS Registration of the UE without the UE sending a NAS Registration Request to the network node.

23. A user equipment (UE) configured for supporting satellite wireless access to a serving public land mobile network (PLMN), the UE comprising:

a wireless transceiver configured to wirelessly communicate with a communication satellite;

at least one memory;

at least one processor coupled to the wireless transceiver and the at least one memory, wherein the at least one processor is configured to:

send, via the wireless transceiver, a non-access stratum (NAS) request message to a network node in a 5G core network via a Radio Access Network (RAN) node, wherein the NAS request message is not a NAS Registration Request message, wherein the NAS request message is forwarded to the network node by the RAN node in a Next Generation Application Protocol (NGAP) transport message, wherein the NGAP transport message includes user location information including a tracking area (TA) identity (TAI) and a cell global identity (CGI) for the UE, wherein the TAI is not part of a registration area (RA) for the UE, wherein the RA comprises one or more TAIs for TAs that the UE is allowed to access without performing Registration update with the core network, wherein the UE is located in a TA indicated by the TAI; and receive, via the wireless transceiver, from the network node results of a NAS Registration performed by the network node, the results including a new RA that comprises an indication of one or more allowed TAs for the UE.

24. The UE of claim 23, wherein the TAI is included in the new RA.

25. The UE of claim 23, wherein the UE sends the NAS request message using a satellite radio cell for the RAN node, wherein the satellite radio cell indicates support for at least one TAI in the RA for the UE.

26. The UE of claim 23, wherein the at least one processor is further configured to:

receive, via the wireless transceiver, from the network node an indication to request Registration;

send, via the wireless transceiver, a NAS Registration Request message to the network node; and receive, via the wireless transceiver, a NAS Registration Accept message from the network node, wherein the NAS Registration Accept message includes the new RA for the UE.

27. The UE of claim 26, wherein the at least one processor is further configured to:

receive, via the wireless transceiver, a NAS reject message from the network node rejecting a NAS procedure associated with the NAS request message; and send, via the wireless transceiver, a second NAS request message to the network node after receiving the results of the NAS Registration, wherein the second NAS request message comprises a request for the NAS procedure, wherein the second NAS request message is forwarded by the RAN node in a second NGAP transport message.

28. The UE of claim 26, wherein the network node performs a NAS procedure associated with the NAS request message, wherein the at least one processor is further configured to:

receive, via the wireless transceiver, a NAS response message from the network node confirming that the NAS procedure was performed.

29. The UE of claim 28, wherein the at least one processor is further configured to receive, via the wireless transceiver, a NAS configuration update command from the network node that includes the indication to request Registration.

30. The UE of claim 23, wherein the network node performs the NAS Registration of the UE without the UE sending a NAS Registration Request to the network node.

* * * * *